(12) United States Patent
Dai et al.

(10) Patent No.: US 10,721,657 B2
(45) Date of Patent: Jul. 21, 2020

(54) METHOD, SYSTEM, AND RELATED DEVICE FOR OBTAINING USER EQUIPMENT CONTEXT INFORMATION

(71) Applicant: Huawei Technologies Co., Ltd., Shenzhen, Guangdong (CN)

(72) Inventors: Mingzeng Dai, Shanghai (CN); Hongping Zhang, Shanghai (CN); Qinghai Zeng, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 94 days.

(21) Appl. No.: 15/938,248

(22) Filed: Mar. 28, 2018

(65) Prior Publication Data
US 2018/0220341 A1   Aug. 2, 2018

Related U.S. Application Data

(63) Continuation of application No. PCT/CN2015/091212, filed on Sep. 30, 2015.

(51) Int. Cl.
*H04W 36/18* (2009.01)
*H04W 36/00* (2009.01)
(Continued)

(52) U.S. Cl.
CPC ... *H04W 36/0038* (2013.01); *H04W 36/0079* (2018.08); *H04W 36/08* (2013.01);
(Continued)

(58) Field of Classification Search
CPC . H04W 36/0038; H04W 76/27; H04W 76/18; H04W 76/19; H04W 36/0033; H04W 76/28; H04W 36/08; H04W 88/08
See application file for complete search history.

(56) References Cited

U.S. PATENT DOCUMENTS

2012/0077509 A1\* 3/2012 Huang ............... H04W 76/19
455/450
2013/0039287 A1   2/2013 Rayavarapu et al.
(Continued)

FOREIGN PATENT DOCUMENTS

CN   101848536 A   9/2010
CN   102598786 A   7/2012
(Continued)

OTHER PUBLICATIONS

3GPP TR 23.720 V1.0.0(Sep. 2015),3rd Generation Partnership Project;Technical Specification Group Services and System Aspects;Architecture enhancements for Cellular Internet of Things(Release 13),total 74 pages.

*Primary Examiner* — Lan-Huong Truong
(74) *Attorney, Agent, or Firm* — Womble Bond Dickinson (US) LLP

(57) ABSTRACT

The invention discloses a method of obtaining user equipment context information that includes: receiving, by a first base station, a first radio resource control (RRC) connection establishment request sent by a user equipment (UE), where the first RRC connection establishment request carries connection status information before the UE sends the first RRC connection establishment request; determining, by the first base station according to the connection status information, whether the first base station meets a condition for requesting the UE context information; if the first base station determines that the first base station does not meet the condition for requesting the UE context information, sending, by the first base station, the UE context information establishment request to a mobility management entity (MME); and receiving, by the first base station, a response message sent by the MME for responding to the UE context information establishment request, where the response message carries the UE context information.

13 Claims, 11 Drawing Sheets

(51) Int. Cl.
*H04W 36/08* (2009.01)
*H04W 76/19* (2018.01)
*H04W 76/28* (2018.01)
*H04W 76/18* (2018.01)
*H04W 76/27* (2018.01)
*H04W 88/08* (2009.01)

(52) U.S. Cl.
CPC ........... *H04W 76/18* (2018.02); *H04W 76/19* (2018.02); *H04W 76/27* (2018.02); *H04W 76/28* (2018.02); *H04W 36/0033* (2013.01); *H04W 88/08* (2013.01)

(56) References Cited

U.S. PATENT DOCUMENTS

| | | | |
|---|---|---|---|
| 2013/0182563 A1* | 7/2013 | Johansson | H04W 76/18 370/228 |
| 2014/0179325 A1* | 6/2014 | Xu | H04W 36/0055 455/437 |
| 2015/0282145 A1* | 10/2015 | Kim | H04W 72/0406 455/450 |
| 2016/0095004 A1* | 3/2016 | Tseng | H04W 48/00 370/228 |
| 2017/0311372 A1 | 10/2017 | Huang | |

FOREIGN PATENT DOCUMENTS

| | | |
|---|---|---|
| CN | 103108403 A | 5/2013 |
| CN | 103782628 A | 5/2014 |
| CN | 103858512 A | 6/2014 |
| CN | 103858513 A | 6/2014 |
| CN | 103906152 A | 7/2014 |
| CN | 104823478 A | 8/2015 |
| WO | 2008095935 A1 | 8/2008 |
| WO | 2010/124430 A1 | 11/2010 |
| WO | 2011147098 A1 | 12/2011 |

* cited by examiner

METHOD, SYSTEM, AND RELATED DEVICE FOR OBTAINING USER EQUIPMENT CONTEXT INFORMATION

CROSS-REFERENCE TO RELATED APPLICATIONS

This application is a continuation of International Application No. PCT/CN2015/091212, filed on Sep. 30, 2015, the disclosure of which is incorporated herein by reference in its entirety.

TECHNICAL FIELD

Embodiments of the present invention relate to the field of communications technologies, and in particular, to method, system, and related device for obtaining user equipment context information.

BACKGROUND

Discontinuous reception (DRX) is mainly intended to reduce power consumption of user equipment (UE), and the DRX is configured by means of radio resource control (RRC). UE on which the DRX is configured to discontinuously listen on a physical downlink control channel (PDCCH) to reduce power consumption. In an RRC_CONNECTED mode, if the DRX is configured, the UE discontinuously listens on the PDCCH according to a specified DRX operation. That is, in one DRX period, the UE regularly wakes up for a specific time period to listen on the PDCCH, and in other time, the UE enters a sleep state. If the DRX is not configured, the UE needs to continuously listen on the PDCCH.

In a long DRX state, the UE has a relatively low listening frequency, and consequently handover may fail. After handover of the UE fails, the UE performs an RRC connection re-establishment procedure, and a prerequisite for successful RRC connection re-establishment is that a cell to which the UE initiates the RRC re-establishment has a piece of valid UE context information. In the prior art, when the UE re-selects a new cell, the UE sends an RRC re-establishment request to a base station to which the new cell belongs. If the base station to which the new cell belongs does not have context information of the UE, the context information is requested by using a context fetch procedure from an original cell that serves the UE, so that the UE can complete RRC establishment in the new cell.

Because cell reselection is a voluntary behavior of the UE, there may be no X2 network interface between the new cell re-selected by the UE and the original cell. Consequently, it is possible that the context fetch procedure cannot be completed, and further the RRC connection re-establishment fails.

SUMMARY

Embodiments of the present invention provide method, system, and device for obtaining user equipment context information to avoid a delay and signaling for releasing UE and re-establishing a connection after handover of the UE fails, thereby facilitating quick recovery of a service.

A first aspect of the embodiments of the invention provides a method of obtaining user equipment context information that includes:

receiving, by a first base station, a first radio resource control (RRC) connection establishment request sent by a user equipment (UE), where the first RRC connection establishment request carries connection status information before the UE sends the first RRC connection establishment request;

determining, by the first base station according to the connection status information, whether the first base station meets a condition for requesting the UE context information;

if the first base station determines that the first base station does not meet the condition for requesting the UE context information, sending, by the first base station, the UE context information establishment request to a mobility management entity (MME); and receiving, by the first base station, a response message sent by the MME for responding to the UE context information establishment request, where the response message carries the UE context information.

In one embodiment, the connection status information includes an identifier of an MME in which the UE belongs, and determining, by the first base station according to the connection status information, whether the first base station meets a condition for requesting a second base station for the UE context information includes:

determining, by the first base station according to the identifier of the MME in which the UE belongs, whether the first base station is connected to the MME in which the UE belongs; and if the first base station is not connected to the MME in which the UE belongs, determining, by the first base station, that the first base station does not meet the condition for requesting the UE context information.

In one embodiment, the MME is different from the MME in which the UE belongs, where the UE context information establishment request carries an identifier of the UE and the identifier of the MME in which the UE belongs, and the UE context information establishment request is used to trigger the MME to request the MME in which the UE belongs for the UE context information according to the identifier of the MME in which the UE belongs.

In one embodiment, the connection status information includes an identifier of a second base station, and determining, by the first base station according to the connection status information, whether the first base station meets a condition for requesting the UE context information includes:

determining, by the first base station according to the identifier of the second base station, whether there is an interface for connecting the first base station and the second base station; and if there is no interface for connecting the first base station and the second base station, determining, by the first base station, that the first base station does not meet the condition for requesting the UE context information.

In one embodiment, the MME is an MME in which the UE belongs, where the first base station is connected to the MME in which the UE belongs, where the UE context information establishment request carries an initial message of the UE, and the UE context information establishment request is used to trigger the MME in which the UE belongs to request the second base station for the UE context information according to the initial message of the UE.

In one embodiment, before sending, by the first base station, the UE context information establishment request to a mobility management entity MME, the method further includes:

sending, by the first base station, a rejection message of the first RRC connection establishment request to the UE, where the rejection message is used to trigger the UE to perform tracking area update (TAU); and receiving, by the first base station, a second RRC connection establishment request sent by the UE, and selecting, according to the second RRC connection establishment request, an MME other than the MME in which the UE belongs.

In one embodiment, after receiving, by the first base station, a response message sent by the MME for responding to the UE context information establishment request, the method further includes: sending, by the first base station, an RRC connection re-establishment completion response to the UE, where the RRC connection re-establishment completion response carries a configuration indication, a security initialization indication, configuration information, and a security parameter.

In one embodiment, after receiving, by the first base station, a response message sent by the MME for responding to the UE context information establishment request, the method further includes: receiving, by the first base station, cache data sent by the second base station.

A second aspect of the embodiments of the invention provides another method of obtaining user equipment context information that includes:

receiving, by a user equipment UE, a UE voluntary movement parameter sent by a second base station;

selecting, by the UE, a first base station according to the UE voluntary movement parameter; and sending, by the UE, a first RRC connection establishment request to the first base station according to the UE voluntary movement parameter, where the first RRC connection establishment request carries connection status information before the UE sends the first RRC connection establishment request, and the first RRC connection establishment request is used to instruct the first base station to: when determining, according to the connection status information, that the first base station does not meet a condition for requesting UE context information, send the UE context information establishment request to a mobility management entity MME.

In one embodiment, after sending, by the UE, a first RRC connection establishment request to the first base station according to the UE voluntary movement parameter, the method further includes:

receiving, by the UE, an RRC connection establishment completion response sent by the first base station, where the RRC connection re-establishment completion response carries a configuration indication, a security initialization indication, configuration information, and a security parameter;

deleting, by the UE, initial configuration information and using the configuration information according to the configuration indication; and activating, by the UE, the security parameter according to the security initialization indication.

In one embodiment, after the sending, by the UE, a RRC connection establishment request to the first base station according to the UE voluntary movement parameter, the method further includes:

receiving, by the UE, a rejection message that is of the first RRC connection establishment request and that is sent by the first base station; and performing, by the UE, a TAU procedure, and sending a second RRC connection establishment request to the first base station, where the second RRC connection establishment request is used to trigger the first base station to select an MME other than an MME in which the UE belongs.

A third aspect of the embodiments of the invention provides a base station, including:

a receiving unit configured to receive a first radio resource control RRC connection establishment request sent by a UE, where the first RRC connection establishment request carries connection status information before the UE sends the first RRC connection establishment request;

a determining unit configured to determine, according to the connection status information, whether the first base station meets a condition for requesting the UE context information; and a sending unit configured to: if the determining unit determines that the first base station does not meet the condition for requesting the UE context information, send the UE context information establishment request to an MME, where the receiving unit is further configured to receive a response message sent by the MME for responding to the UE context information establishment request, where the response message carries the UE context information.

In one embodiment, the connection status information includes an identifier of an MME in which the UE belongs, and the determining unit is further configured to:

determine, according to the identifier of the MME in which the UE belongs, whether the first base station is connected to the MME in which the UE belongs, where if the first base station is not connected to the MME in which the UE belongs, the determining unit determines that the first base station does not meet the condition for requesting the UE context information.

In one embodiment, the MME is different from the MME in which the UE belongs, the UE context information establishment request carries an identifier of the UE and the identifier of the MME in which the UE belongs, and the UE context information establishment request is used to trigger the MME to request the MME in which the UE belongs for the UE context information according to the identifier of the MME in which the UE belongs.

In one embodiment, the connection status information includes an identifier of a second base station, and the determining unit is further configured to:

determine, according to the identifier of the second base station, whether there is an interface for connecting the first base station and the second base station, where if there is no interface for connecting the first base station and the second base station, the determining unit determines that the first base station does not meet the condition for requesting the UE context information.

In one embodiment, the MME is an MME in which the UE belongs, where the first base station is connected to the MME in which the UE belongs, where the UE context information establishment request carries an initial message of the UE, and the UE context information establishment request is used to trigger the MME in which the UE belongs to request the second base station for the UE context information according to the initial message of the UE.

In one embodiment, the sending unit is further configured to send a rejection message of the first RRC connection establishment request to the UE, where the rejection message is used to trigger the UE to perform TAU; and the receiving unit is further configured to: receive a second RRC connection establishment request sent by the UE, and select, according to the second RRC connection establishment request, an MME other than the MME in which the UE belongs.

In one embodiment, the sending unit is further configured to send an RRC connection re-establishment completion response to the UE, where the RRC connection re-establishment completion response carries a configuration indication, a security initialization indication, configuration information, and a security parameter.

In one embodiment, the receiving unit is further configured to receive cache data sent by the second base station.

A fourth aspect of the embodiments of the invention provides a UE that includes:

a receiving unit configured to receive a UE voluntary movement parameter sent by a second base station;

a selection unit configured to select a first base station according to the UE voluntary movement parameter received by the receiving unit; and a sending unit configured to send a first RRC connection establishment request to the first base station according to the UE voluntary movement parameter received by the receiving unit, where the first RRC connection establishment request carries connection status information before the UE sends the first RRC connection establishment request, and the first RRC connection establishment request is used to instruct the first base station to: when determining, according to the connection status information, that the first base station does not meet a condition for requesting UE context information, send the UE context information establishment request to an MME.

In one embodiment, the receiving unit is further configured to receive an RRC connection establishment completion response sent by the first base station, where the RRC connection re-establishment completion response carries a configuration indication, a security initialization indication, configuration information, and a security parameter; and the UE further includes: a processing unit configured to: delete initial configuration information and use the configuration information according to the configuration indication; and activate the security parameter according to the security initialization indication.

In one embodiment, the receiving unit is further configured to receive a rejection message that is of the first RRC connection establishment request and that is sent by the first base station;

the processing unit is further configured to perform a TAU procedure; and the sending unit is further configured to send a second RRC connection establishment request to the first base station, where the second RRC connection establishment request is used to trigger the first base station to select an MME other than an MME in which the UE belongs.

A fifth aspect of the embodiments of the invention provides another UE that includes:

a processor and a memory coupled to the processor to store instructions, which when executed by the processor, cause the processor to perform operations that include:

receiving a UE voluntary movement parameter sent by a second base station;

selecting a first base station according to the UE voluntary movement parameter; and sending a first RRC connection establishment request to the first base station according to the UE voluntary movement parameter, where the first RRC connection establishment request carries connection status information before the UE sends the first RRC connection establishment request, and the first RRC connection establishment request is used to instruct the first base station to: when determining, according to the connection status information, that the first base station does not meet a condition for requesting UE context information, send the UE context information establishment request to an MME.

In one embodiment, after sending a first RRC connection establishment request to the first base station according to the UE voluntary movement parameter, the operations further include:

receiving an RRC connection establishment completion response sent by the first base station, where the RRC connection re-establishment completion response carries a configuration indication, a security initialization indication, configuration information, and a security parameter;

deleting initial configuration information and use the configuration information according to the configuration indication; and activating the security parameter according to the security initialization indication.

In one embodiment, after sending an RRC connection establishment request to the first base station according to the UE voluntary movement parameter, the operations further include:

receiving a rejection message that is of the first RRC connection establishment request and that is sent by the first base station; and performing a TAU procedure, and send a second RRC connection establishment request to the first base station, where the second RRC connection establishment request is used to trigger the first base station to select an MME other than an MME in which the UE belongs.

Implementation of the embodiments of the invention brings the following beneficial effects:

In the embodiments of the invention, when the first base station receives the RRC connection establishment request sent by the UE, and the first base station determines, according to the connection status information that exists before the UE sends the RRC connection establishment request and that is carried in the RRC connection establishment request, that the first base station does not meet the condition for requesting the UE context information, that is, cannot request for the UE context information by way of context fetch, the first base station sends the UE context information establishment request to the MME. The MME sends the response message to the first base station when completing establishing the UE context information, and the response message carries the UE context information, so that the first base station completes an RRC connection re-establishment procedure according to the UE context information, so as to avoid a delay and signaling for releasing the UE and re-establishing a connection after handover of the UE fails, thereby facilitating quick recovery of a service.

BRIEF DESCRIPTION OF DRAWINGS

To describe the technical solutions in the embodiments of the invention. Apparently, the accompanying drawings in the following description show merely some embodiments of the invention, and persons of ordinary skill in the art may still derive other drawings from these accompanying drawings without creative efforts.

DESCRIPTION OF EMBODIMENTS

Embodiments of the invention provide method, system, and related device for obtaining user equipment context information in order to avoid a delay and signaling for releasing a UE and re-establishing a connection after handover of the UE fails, thereby facilitating quick recovery of a service.

To make persons skilled in the art understand the technical solutions in the invention better, the following clearly describes the technical solutions in the embodiments of the invention with reference to the accompanying drawings in the embodiments of the invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Details are separately described in the following.

In the specification, claims, and accompanying drawings of the present invention, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this specification means that a specific characteristic, structure, or feature described with reference to the embodiment may be included in at least one embodiment of the present invention. This phrase appearing in various locations of this specification does not necessarily mean a same embodiment, or an independent or a candidate embodiment that is exclusive to another embodiment. It may be explicitly or implicitly understood by persons skilled in the art that the embodiments described in this specification may be combined with another embodiment.

Figure 1:
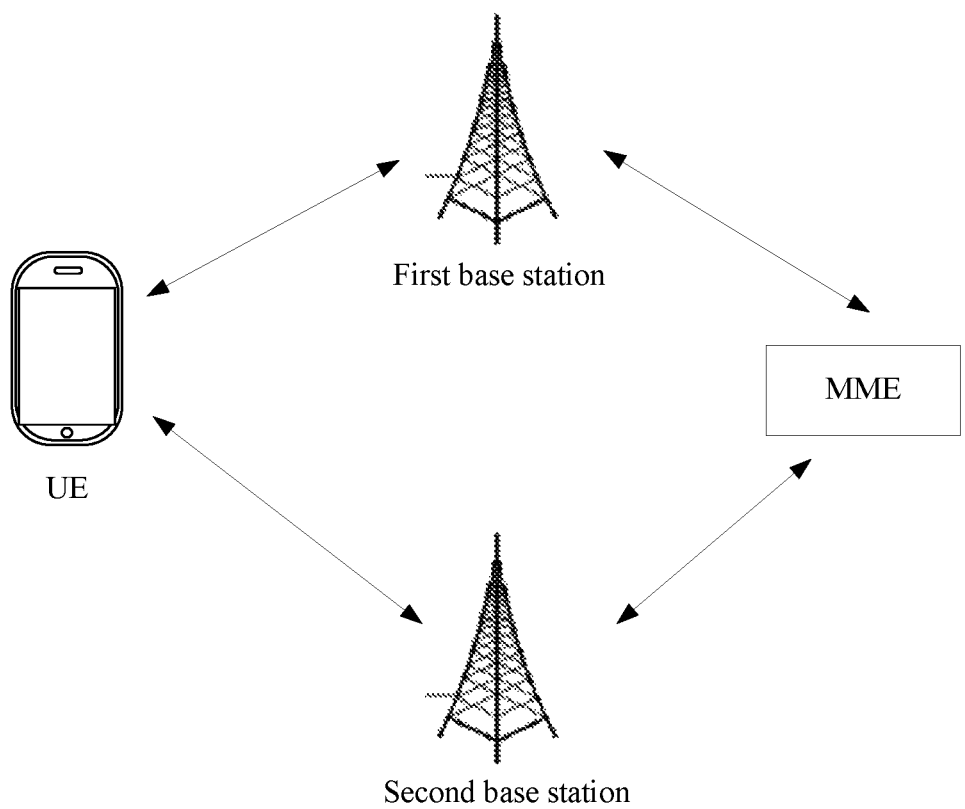
FIG. 1 shows a network architecture according to an embodiment of the invention.

To better understand a music playing method applied to a method, system, and related device for obtaining user equipment context information that are disclosed in the embodiments of the invention, the following first describes a network architecture that is applicable to the embodiments of the invention. Referring to FIG. 1, FIG. 1 is a schematic diagram of a network architecture disclosed in an embodiment of the invention. The network architecture shown in FIG. 1 may include a first base station, a second base station, a user equipment (UE), and a core network, such as mobility management entity (MME). The first base station, the second base station, the UE, and the MME may be communicatively connected in a radio manner. In the network architecture, the UE may include various UEs that use a mobile communications network, such as a mobile phone, a tablet computer (for example, using a wireless tariff card to access the Internet), a personal digital assistant (PDA), a mobile Internet device (MID), an intelligent wearable device (such as a smart watch or a smart band). This is not limited in this embodiment of the invention. In the network architecture shown in FIG. 1, a delay and signaling for releasing the UE and re-establishing a connection after handover of the UE fails may be avoided, thereby facilitating quick recovery of a service.

An embodiment of the invention provides a method of obtaining user equipment context information. The method includes: receiving, by a first base station, a first radio resource control (RRC) connection establishment request sent by a UE, where the first RRC connection establishment request carries connection status information before the UE sends the first RRC connection establishment request; determining, by the first base station according to the connection status information, whether the first base station meets a condition for requesting the UE context information; if the first base station determines that the first base station does not meet the condition for requesting the UE context information, sending, by the first base station, the UE context information establishment request to an MME; and receiving, by the first base station, a response message sent by the MME for responding to the UE context information establishment request, where the response message carries the UE context information.

Figure 2:
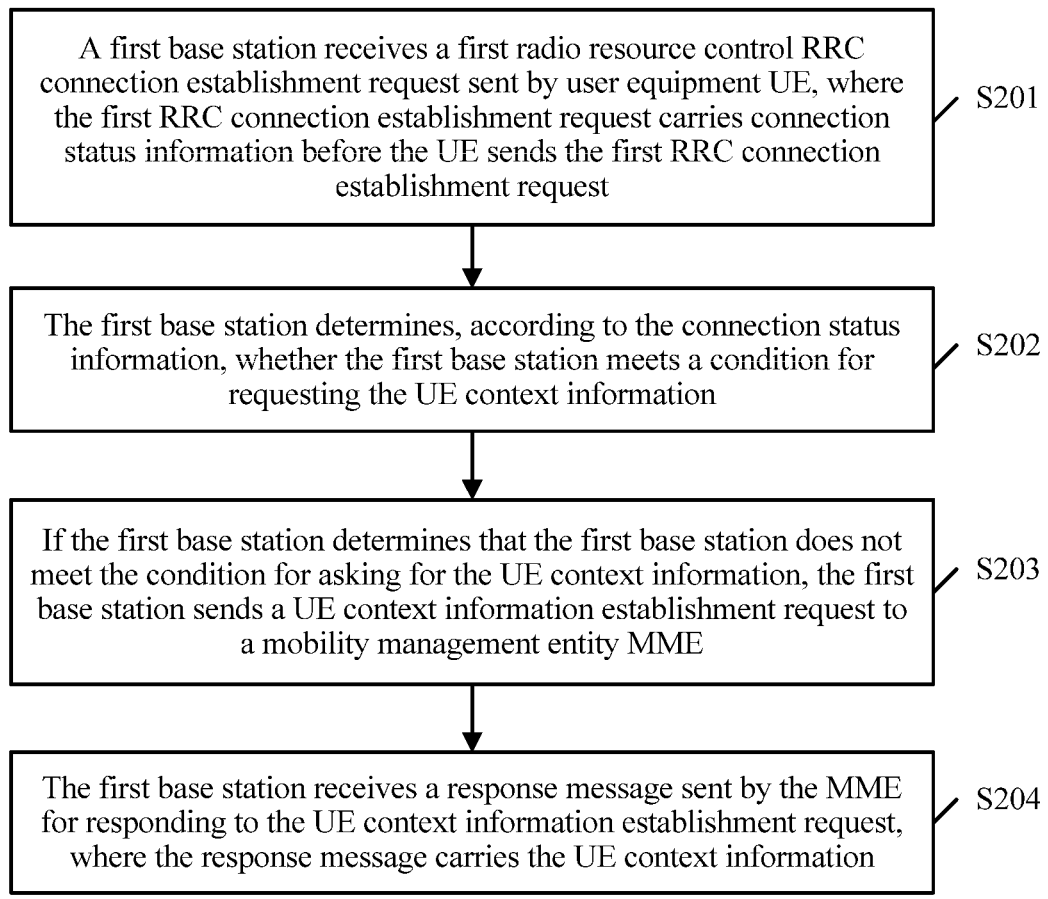
FIG. 2 is a flowchart of a first embodiment of a method of obtaining user equipment context information according to an embodiment of the invention.

Referring to FIG. 2, FIG. 2 is a flowchart of a first embodiment of a method of obtaining user equipment context information according to an embodiment of the invention. As shown in FIG. 2, the method provided in this embodiment of the invention may include steps S201 to S204.

At S201, a first base station receives a first RRC connection establishment request sent by a UE, where the first RRC connection establishment request carries connection status information before the UE sends the first RRC connection establishment request.

In one embodiment, when a second base station allows the UE to voluntarily move in a long DRX state, the second base station sends DRX configuration information to the UE. The DRX configuration information includes a UE voluntary movement parameter that includes a UE voluntary movement trigger moment, a UE voluntary movement range, a UE voluntary movement stop moment, and a moment at which the UE initiates RRC connection re-establishment. By default, the UE voluntary movement trigger moment is a moment at which the UE enters a UE voluntary movement state after the UE enters a long DRX sleep period. Entering the long DRX sleep period includes a long DRX inactive timer that expires, long DRX wake-up that expires, or the UE directly receives a long DRX command. Alternatively, the UE voluntary movement trigger moment is a specific time, for example, a moment at which the UE enters the UE voluntary movement state after the UE enters the long DRX sleep period for a specific time period, or a moment at which the UE enters the voluntary movement state when signal quality of a serving cell is lower than a preset threshold. The UE voluntary movement range is a range within which a network can control the UE to voluntarily move, and the UE is allowed to voluntarily move only in a specific range. For example, a cell to which the UE can move, a frequency on which the UE can move, and a list of tracking areas (TAs) in which the UE can move are configured, and priorities of candidate cells to which the UE can move are configured, and the UE voluntarily moves in the UE voluntary movement range according to a specific priority rule. The UE voluntary movement stop moment is a configured UE voluntary movement prohibit time (or prohibit timer), and the UE stops voluntary movement within the time. The UE voluntary movement stop moment may be a time prior to DRX wake-up of the UE. This way, upon waking up, the UE can quickly report a measurement report, trigger network control switching, and so on. The moment at which the UE initiates an RRC connection re-establishment is a moment at which the UE initiates the RRC connection re-establishment to a new base station or a base station to which a new cell belongs when the UE detects handover to the new cell or the new base station.

In one embodiment, the UE sends the first RRC connection establishment request. For example, after entering a long DRX sleep state, the UE voluntarily moves (for example, re-selects a cell) according to the UE voluntarily movement parameter, and after the UE is handed over to a cell, the UE sends the first radio resource control RRC connection establishment request to the first base station according to the moment at which the UE initiates RRC connection re-establishment and that is included in the UE voluntarily movement parameter. The first RRC connection establishment request carries the connection status information before the UE sends the first RRC connection establishment request, and the connection status information includes an identifier of the UE, an RRC connection re-establishment reason, an identifier of an original cell or an identifier of an original base station (that is, an identifier of the second base station), and the like. The identifier of the UE may be an overall service account of the UE that is associated with a user's overall data service status, such as a subscriber identity module (SIM) card number, an international mobile subscriber identity number (IMSI), or a mobile station international ISDN number (also referred to as mobile number, mobile subscriber international ISDN/PSTN number, or MSISDN). The overall service account may be, for example, corresponding to a monthly paid traffic account of a mobile phone. That is, in the overall service account, all traffic consumed by a user for daily applications such as Internet surfing, email sending, chat, file transmission, or video chat by using the UE is counted to a traffic tariff corresponding to the overall service account. A data service account of the UE may further be a particular service account associated with a user's particular data service status, such as a QQMusic listen free data package, a green diamond listen free data package, or an LeTV video content data package.

In a service corresponding to the particular service account, traffic consumed by a user who uses the service by using the UE is counted only to the particular service account, but not to the overall service account. For example, if a user purchases the QQMusic listen free data package, an OCS system generates a particular service account corresponding to a QQMusic listen free service of the user, and the particular service account may be in a form such as 765367XXX_QQ_music_VIP.

At S202, the first base station determines, according to connection status information, whether the first base station meets a condition for requesting the UE context information.

In one embodiment, whether the first base station meets the condition for requesting the UE context information means whether the first base station can request for the UE context information by using a context fetch procedure.

In one embodiment, the connection status information includes the identifier of the second base station, and the first base station determines, according to the connection status information, whether the first base station meets the condition for requesting the UE context information. For example, the first base station determines, according to the identifier of the second base station, whether there is an interface for connecting the first base station and the second base station, and if there is no interface for connecting the first base station and the second base station, the first base station determines that the first base station does not meet the condition for requesting the UE context information. That is, the first base station determines, according to the identifier of the second base station, whether there is an X2 network connection interface for directly connecting the first base station and the second base station. If there is no X2 network connection interface for directly connecting the first base station and the second base station, the first base station cannot request the second base station for the UE context information by using the context fetch procedure, that is, the first base station does not meet the condition for requesting the UE context information.

In one embodiment, the connection status information includes an identifier of an MME in which the UE belongs, and the first base station determines, according to the connection status information, whether the first base station meets the condition for requesting the UE context information. For example, the first base station determines, according to the identifier of the MME in which the UE belongs, whether the first base station is connected to the MME in which the UE belongs, and if the first base station is not connected to the MME in which the UE belongs, the first base station determines that the first base station does not meet the condition for requesting the UE context information. That is, the first base station determines, according to the identifier of the MME in which the UE belongs, whether the first base station and the second base station are connected to a same MME. If the first base station and the second base station are not connected to the same MME, the first base station cannot request, by using the context fetch procedure, the identifier of the MME in which the UE belongs for the UE context information, that is, the first base station does not meet the condition for requesting the UE context information.

At S203, if the first base station determines that the first base station does not meet the condition for requesting the UE context information, the first base station sends the UE context information establishment request to an MME.

In one embodiment, the first base station sends the UE context information establishment request to the MME if there is no interface for connecting the first base station and the second base station. That is, there is no X2 network connection interface for connecting the first base station and the second base station, when the first base station is connected to the MME in which the UE belongs, the first base station sends the UE context information establishment request to the MME in which the UE belongs. The UE context information establishment request carries an initial message of the UE, and the initial message of the UE includes the identifier of the UE, the identifier of the second base station, and the like. The UE context information establishment request is used to trigger the MME in which the UE belongs to request the second base station for the UE context information according to the initial message of the UE. In one embodiment, the MME in which the UE belongs requests the second base station for the UE context information according to the initial message of the UE. For example, the MME in which the UE belongs sends a UE context information obtaining request to the second base station according to the identifier of the second base station, and the UE context information obtaining request carries the identifier of the UE, so that the second base station obtains the UE context information according to the identifier of the UE, and sends the UE context information to the MME in which the UE belongs.

In one embodiment, the first base station sends the UE context information establishment request to the MME. For example, if the first base station is not connected to the MME in which the UE belongs, that is, the first base station cannot request the MME in which the UE belongs for the UE context information by way of context fetch, the first base station sends the UE context information establishment request to the MME. The MME is different from the MME in which the UE belongs, the UE context information establishment request carries the identifier of the UE and the identifier of the MME in which the UE belongs, and the UE context information establishment request is used to trigger the MME to request the MME in which the UE belongs for the UE context information according to the identifier of the MME in which the UE belongs. The MME is an MME randomly selected by the first base station from all MMEs that can be connected to the first base station, after the first base station receives a second RRC connection establishment request sent by the UE. If the first base station can be connected to more than one MME, the first base station may select the MME. For instance, the first base station selects an MME of a higher priority as the foregoing MME according to priorities of the MMEs. The second RRC connection establishment request is sent by the UE to the first base station when the UE receives a rejection message that is of the first RRC connection establishment request and that is sent by the first base station. The rejection message is used to trigger the UE to perform TAU.

At S204, the first base station receives a response message sent by the MME for responding to the UE context information establishment request, where the response message carries the UE context information.

In one embodiment, the UE context information includes at least the identifier (ID) of the UE, so that the first base station determines, according to the UE context information, whether the UE that requests re-establishment is authorized during RRC connection re-establishment, and determines whether to allow the RRC re-establishment. If the ID of the UE does not exist in the UE context information, the RRC re-establishment is rejected.

It can be learned that in this embodiment of the invention, when the first base station receives the RRC connection establishment request sent by the UE, and the first base station determines, according to the connection status information that exists before the UE sends the RRC connection establishment request and that is carried in the RRC connection establishment request, that the first base station does not meet the condition for requesting the UE context information, that is, cannot request for the UE context information by way of context fetch, the first base station sends the UE context information establishment request to the MME. The MME sends the response message to the first base station when completing establishing the UE context information, and the response message carries the UE context information, so that the first base station completes an RRC connection re-establishment procedure according to the UE context information, so as to avoid a delay and signaling for releasing the UE and re-establishing a connection after handover of the UE fails, thereby facilitating quick recovery of a service.

In one embodiment, before the sending, by the first base station, the UE context information establishment request to an MME, the method of obtaining user equipment context information shown in FIG. 2 further includes: sending, by the first base station, a rejection message of the first RRC connection establishment request to the UE, where the rejection message is used to trigger the UE to perform TAU; and receiving, by the first base station, a second RRC connection establishment request sent by the UE, and selecting, according to the second RRC connection establishment request, an MME other than the MME in which the UE belongs.

In one embodiment, after receiving, by the first base station, a response message sent by the MME for responding to the UE context information establishment request, the method shown in FIG. 2 further includes: sending, by the first base station, an RRC connection re-establishment completion response to the UE, where the RRC connection re-establishment completion response carries a configuration indication, a security initialization indication, configuration information, and a security parameter.

In one embodiment, after the receiving, by the first base station, a response message sent by the MME for responding to the UE context information establishment request, the method shown in FIG. 2 further includes: receiving, by the first base station, cache data sent by the second base station.

Figure 3:
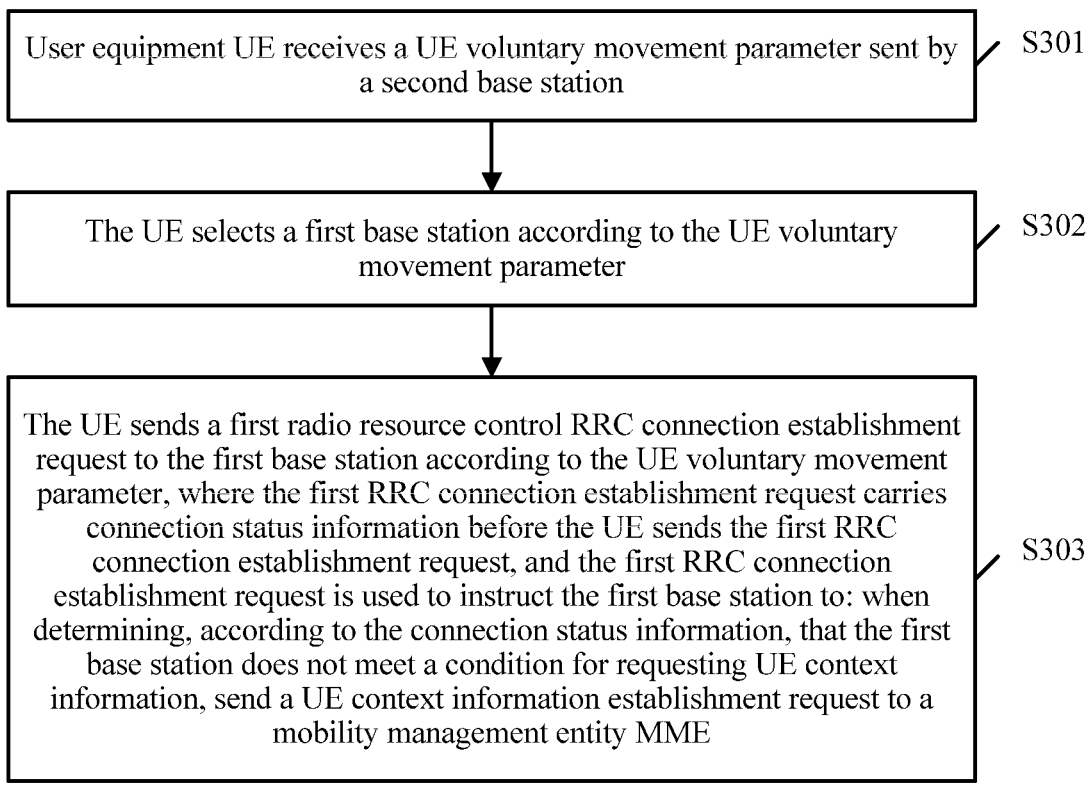
FIG. 3 is a flowchart of a second embodiment of a method of obtaining user equipment context information according to an embodiment of the invention.

Referring to FIG. 3, FIG. 3 is a flowchart of a second embodiment of a method of obtaining user equipment context information according to an embodiment of the invention. As shown in FIG. 3, the method provided in this embodiment of the invention may include steps S301 to S303.

At S301, a UE receives a UE voluntary movement parameter sent by a second base station.

In one embodiment, when the second base station allows the UE to voluntarily move in a long DRX state, the second base station sends DRX configuration information to the UE. The DRX configuration information includes a UE voluntary movement parameter, and the UE voluntary movement parameter includes a UE voluntary movement trigger moment, a UE voluntary movement range, a UE voluntary movement stop moment, and a moment at which the UE initiates RRC connection re-establishment. By default, the UE voluntary movement trigger moment is a moment at which the UE enters a UE voluntary movement state after the UE enters a long DRX sleep period. Entering the long DRX sleep period includes a long DRX inactive timer that expires, long DRX wake-up that expires, or the UE directly receives a long DRX command. Alternatively, the UE voluntary movement trigger moment is a specific time, for example, a moment at which the UE enters the UE voluntary movement state after the UE enters the long DRX sleep period for a specific time period, or a moment at which the UE enters the voluntary movement state when signal quality of a serving cell is lower than a preset threshold. The UE voluntary movement range is a range within which a network can control the UE to voluntarily move, and the UE is allowed to voluntarily move only in a specific range. For example, a cell to which the UE can move, a frequency on which the UE can move, and a list of TAs to which the UE can move are configured, and priorities of candidate cells to which the UE can move are configured, and the UE voluntarily moves in the UE voluntary movement range according to a specific priority rule. The UE voluntary movement stop moment is a configured UE voluntary movement prohibit time (or prohibit timer), and the UE stops voluntary movement within the time. The UE voluntary movement stop moment may be a time prior to DRX waking up of the UE. This way, upon waking up, the UE can quickly report a measurement report, trigger network control switching, and so on. The moment at which the UE initiates RRC connection re-establishment is a moment at which the UE initiates RRC connection re-establishment to a new base station or a base station to which a new cell belongs when the UE detects handover to the new cell or the new base station.

At S302, the UE selects a first base station according to the UE voluntary movement parameter.

In one embodiment, the UE selects the first base station according to the UE voluntary movement parameter. For example, the UE selects the first base station according to the UE voluntary movement range included in the UE voluntary movement parameter. In one embodiment, the UE selects, in the voluntary movement range according to priorities of cells in the voluntary movement range, a cell of a higher priority as an RRC re-establishment cell, or the UE selects, in the voluntary movement range according to signal quality of cells in the voluntary movement range, a cell of higher signal quality as an RRC re-establishment cell, and then the UE uses a base station to which the RRC re-establishment cell belongs as the first base station.

At S303, the UE sends a first RRC connection establishment request to the first base station according to the UE voluntary movement parameter, where the first RRC connection establishment request carries connection status information before the UE sends the first RRC connection establishment request, and the first RRC connection establishment request is used to instruct the first base station to: when determining, according to the connection status information, that the first base station does not meet a condition for requesting UE context information, send the UE context information establishment request to a mobility management entity MME.

In one embodiment, the UE sends the first RRC connection establishment request after entering a long DRX sleep state. In one embodiment, the UE voluntarily moves (for example, re-selects a cell) according to the UE voluntarily movement parameter, and after the UE is handed over to a cell, the UE sends the first RRC connection establishment request to the first base station according to the moment at which the UE initiates RRC connection re-establishment and that is included in the UE voluntarily movement parameter. The first RRC connection establishment request carries the connection status information before the UE sends the first RRC connection establishment request, and the connection status information includes an identifier of the UE, an RRC connection re-establishment reason, an identifier of an original cell or an identifier of an original base station (that is, an identifier of the second base station), and the like. The identifier of the UE may be an overall service account of the UE that is associated with a user's overall data service status, such as a SIM card number, an IMSI, or an MSISDN. The overall service account may be, for example, corresponding to a monthly paid traffic account of a mobile phone. That is, in the overall service account, all traffic consumed by a user for daily applications such as Internet surfing, email sending, chat, file transmission, or video chat by using the UE is counted to a traffic tariff corresponding to the overall service account. A data service account of the UE may further be a particular service account associated with a user's particular data service status, such as a QQMusic listen free data package, a green diamond listen free data package, or an LeTV video content data package. In a service corresponding to the particular service account, traffic consumed by a user who uses the service by using the UE is counted only to the particular service account, but not to the overall service account. For example, a user purchases the QQMusic listen free data package, an OCS system generates a particular service account corresponding to a QQMusic listen free service of the user, and the particular service account may be in a form such as 765367XXX_QQ_music_VIP.

In one embodiment, the first RRC connection establishment request is used to instruct the first base station to: when determining, according to the connection status information, that the first base station does not meet the condition for requesting the UE context information, send the UE context information establishment request to the mobility management entity MME. Whether the first base station meets the condition for requesting the UE context information means whether the first base station can request for the UE context information by using a context fetch procedure.

In one embodiment, the connection status information includes the identifier of the second base station, and the first base station determines, according to the connection status information, whether the first base station meets the condition for requesting the UE context information. For example, the first base station determines, according to the identifier of the second base station, whether there is an interface for connecting the first base station and the second base station, and if there is no interface for connecting the first base station and the second base station, the first base station determines that the first base station does not meet the condition for requesting the UE context information. That is, the first base station determines, according to the identifier of the second base station, whether there is an X2 network connection interface for directly connecting the first base station and the second base station. If there is no X2 network connection interface for directly connecting the first base station and the second base station, the first base station cannot request the second base station for the UE context information by using the context fetch procedure. That is, the first base station does not meet the condition for requesting the UE context information.

In one embodiment, the connection status information includes an identifier of an MME in which the UE belongs, and the first base station determines, according to the connection status information, whether the first base station meets the condition for requesting the UE context information. For instance, the first base station determines, according to the identifier of the MME in which the UE belongs, whether the first base station is connected to the MME in which the UE belongs, and if the first base station is not connected to the MME in which the UE belongs, the first base station determines that the first base station does not meet the condition for requesting the UE context information. That is, the first base station determines, according to the identifier of the MME in which the UE belongs, whether the first base station and the second base station are connected to a same MME. If the first base station and the second base station are not connected to the same MME, the first base station cannot request, by using the context fetch procedure, the identifier of the MME in which the UE belongs for the UE context information. That is, the first base station does not meet the condition for requesting the UE context information.

In one embodiment, the first base station sends the UE context information establishment request to the mobility management entity MME if there is no interface for connecting the first base station and the second base station. That is, there is no X2 network connection interface for connecting the first base station and the second base station, when the first base station is connected to the MME in which the UE belongs, the first base station sends the UE context information establishment request to the MME in which the UE belongs. The UE context information establishment request carries an initial message of the UE, and the initial message of the UE includes the identifier of the UE, the identifier of the second base station, and the like. The UE context information establishment request is used to trigger the MME in which the UE belongs to request the second base station for the UE context information according to the initial message of the UE. In one embodiment, the MME in which the UE belongs requests the second base station for the UE context information according to the initial message of the UE. For example, the MME in which the UE belongs sends a UE context information obtaining request to the second base station according to the identifier of the second base station, and the UE context information obtaining request carries the identifier of the UE, so that the second base station obtains the UE context information according to the identifier of the UE, and sends the UE context information to the MME in which the UE belongs.

In one embodiment, the first base station sends the UE context information establishment request to the MME if the first base station is not connected to the MME in which the UE belongs. That is, the first base station cannot request the MME in which the UE belongs for the UE context information by way of context fetch, the first base station sends the UE context information establishment request to the MME. In one embodiment, the MME is different from the MME in which the UE belongs, the UE context information establishment request carries the identifier of the UE and the identifier of the MME in which the UE belongs, and the UE context information establishment request is used to trigger the MME to request the MME in which the UE belongs for the UE context information according to the identifier of the MME in which the UE belongs. In one embodiment, the MME is an MME randomly selected by the first base station from all MMEs that can be connected to the first base station, after the first base station receives a second RRC connection establishment request sent by the UE. If the first base station can be connected to more than one MME, in one embodiment the first base station may select the MME. For instance, the first base station may select an MME of a higher priority as the foregoing MME according to priorities of the MMEs. The second RRC connection establishment request is sent by the UE to the first base station when the UE receives a rejection message that is of the first RRC connection establishment request and that is sent by the first base station. The rejection message is used to trigger the UE to perform TAU.

It can be learned that in this embodiment of the invention, when the first base station receives the RRC connection establishment request sent by the UE, and the first base station determines, according to the connection status information that exists before the UE sends the RRC connection establishment request and that is carried in the RRC connection establishment request, that the first base station does not meet the condition for requesting the UE context information, that is, cannot request for the UE context information by way of context fetch, the first base station sends the UE context information establishment request to the MME. The MME sends the response message to the first base station when completing establishing the UE context information, and the response message carries the UE context information, so that the first base station completes an RRC connection re-establishment procedure according to the UE context information, so as to avoid a delay and signaling for releasing the UE and re-establishing a connection after handover of the UE fails, thereby facilitating quick recovery of a service.

In one embodiment, after sending, by the UE, a first RRC connection establishment request to the first base station according to the UE voluntary movement parameter, the method shown in FIG. 3 further includes: receiving, by the UE, an RRC connection re-establishment completion response sent by the first base station, where the RRC connection re-establishment completion response carries a configuration indication, a security initialization indication, configuration information, and a security parameter; deleting, by the UE, initial configuration information and using the configuration information according to the configuration indication; and activating, by the UE, the security parameter according to the security initialization indication. Because after the first base station obtains new UE context information, the new context information includes the security parameter (that is, a new security parameter, for example, a new eNB key or KeNB), the first base station needs to activate the security parameter of the UE according to the new KeNB. Therefore, the RRC connection re-establishment completion response sent by the first base station to the UE carries the security initialization indication, so that the UE initializes a derivation key according to the security parameter, and sends the security initialization indication to a non-access stratum (NAS) layer. The security initialization indication carries the security parameter, so that the NAS initializes a security key according to the security parameter.

In one embodiment, after sending, by the UE, an RRC connection establishment request to the first base station according to the UE voluntary movement parameter, the method shown in FIG. 3 further includes: receiving, by the UE, a rejection message that is of the first RRC connection establishment request and that is sent by the first base station; and performing, by the UE, a TAU procedure, and sending a second RRC connection establishment request to the first base station, where the second RRC connection establishment request is used to trigger the first base station to select an MME other than an MME in which the UE belongs.

Figure 4A:
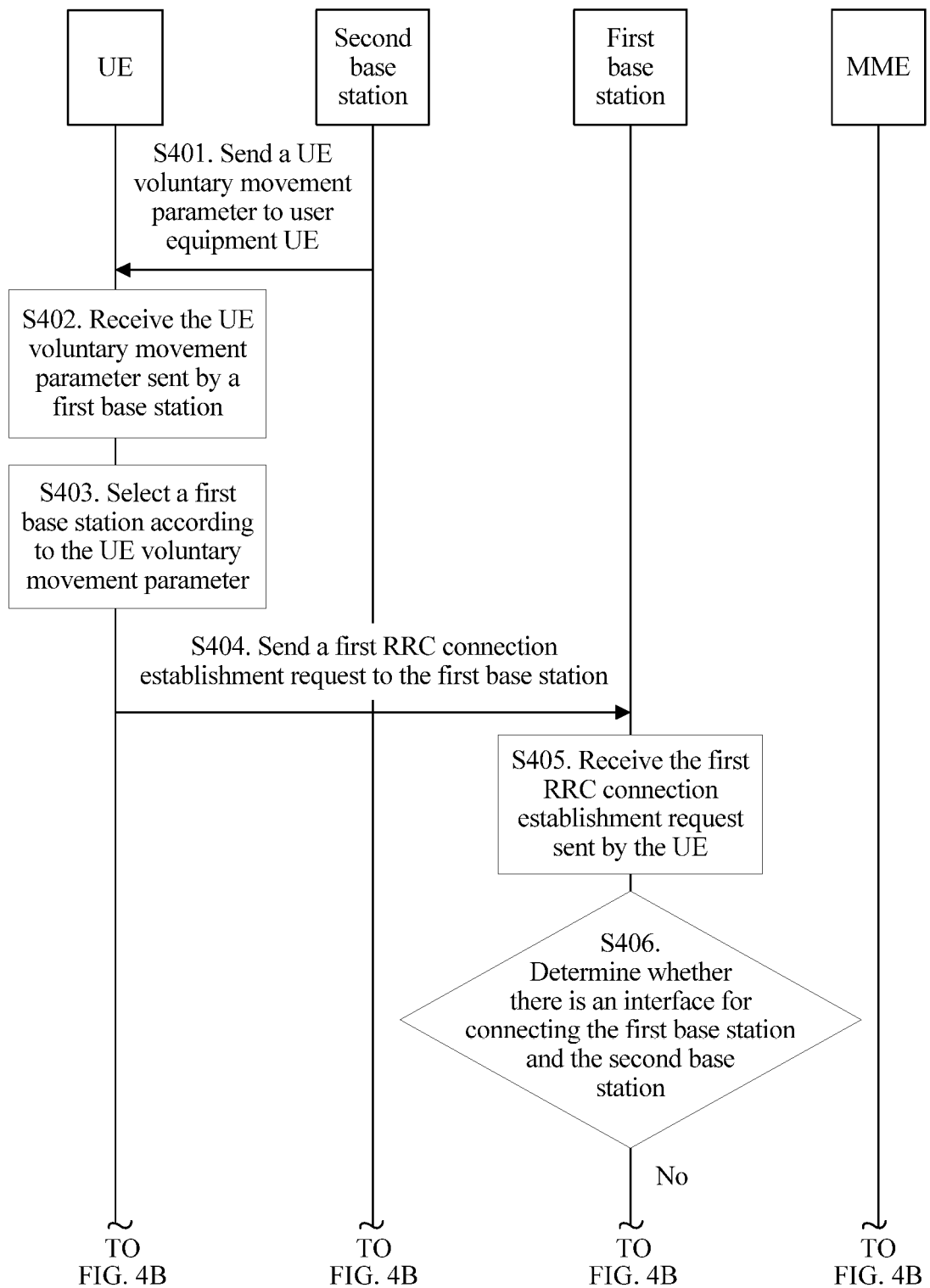
FIG. 4A, FIG. 4B, and FIG. 4C are a flowchart of a third embodiment of a method of obtaining user equipment context information according to an embodiment of the invention.
Figure 4B:
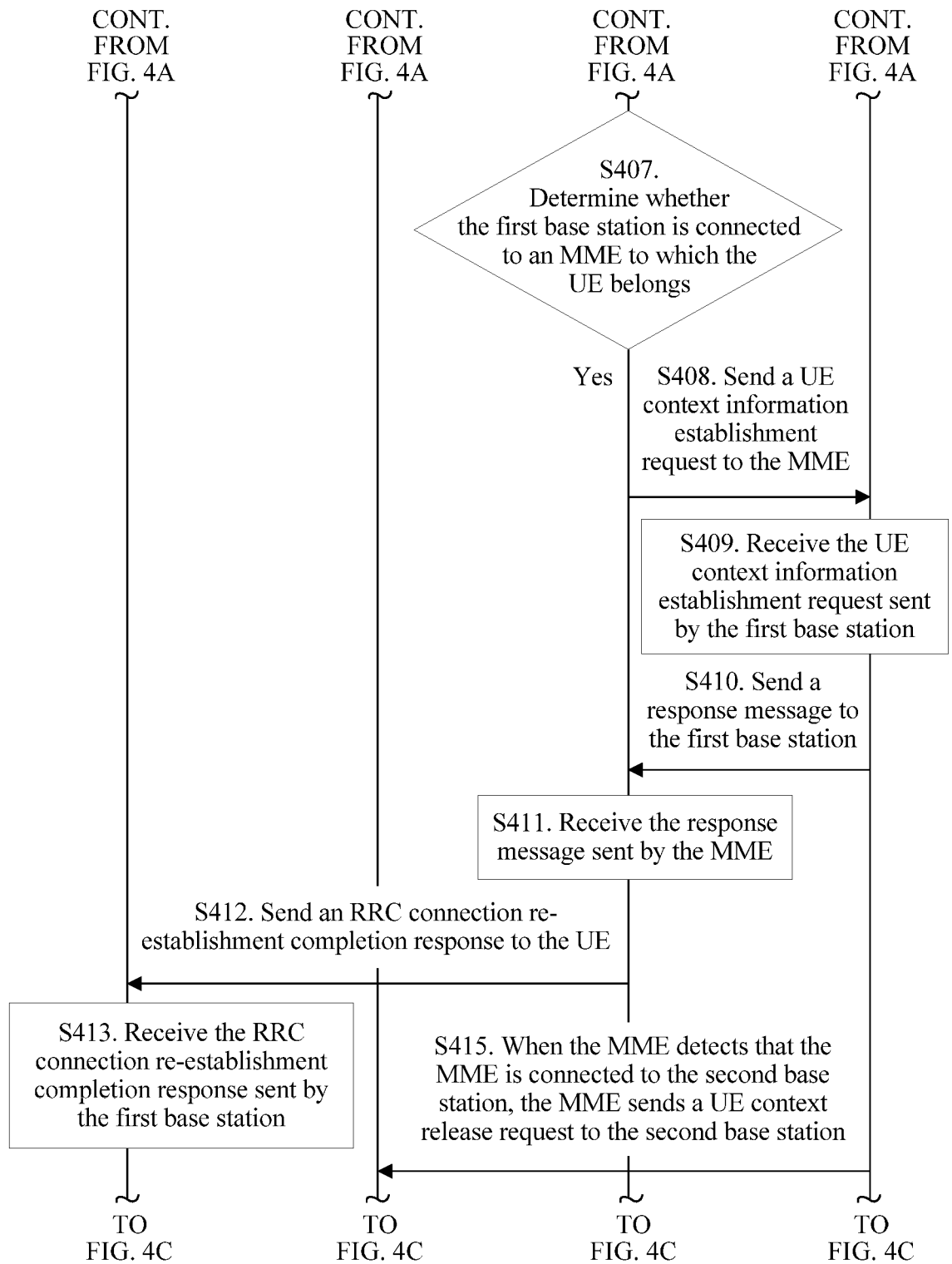
Figure 4C:
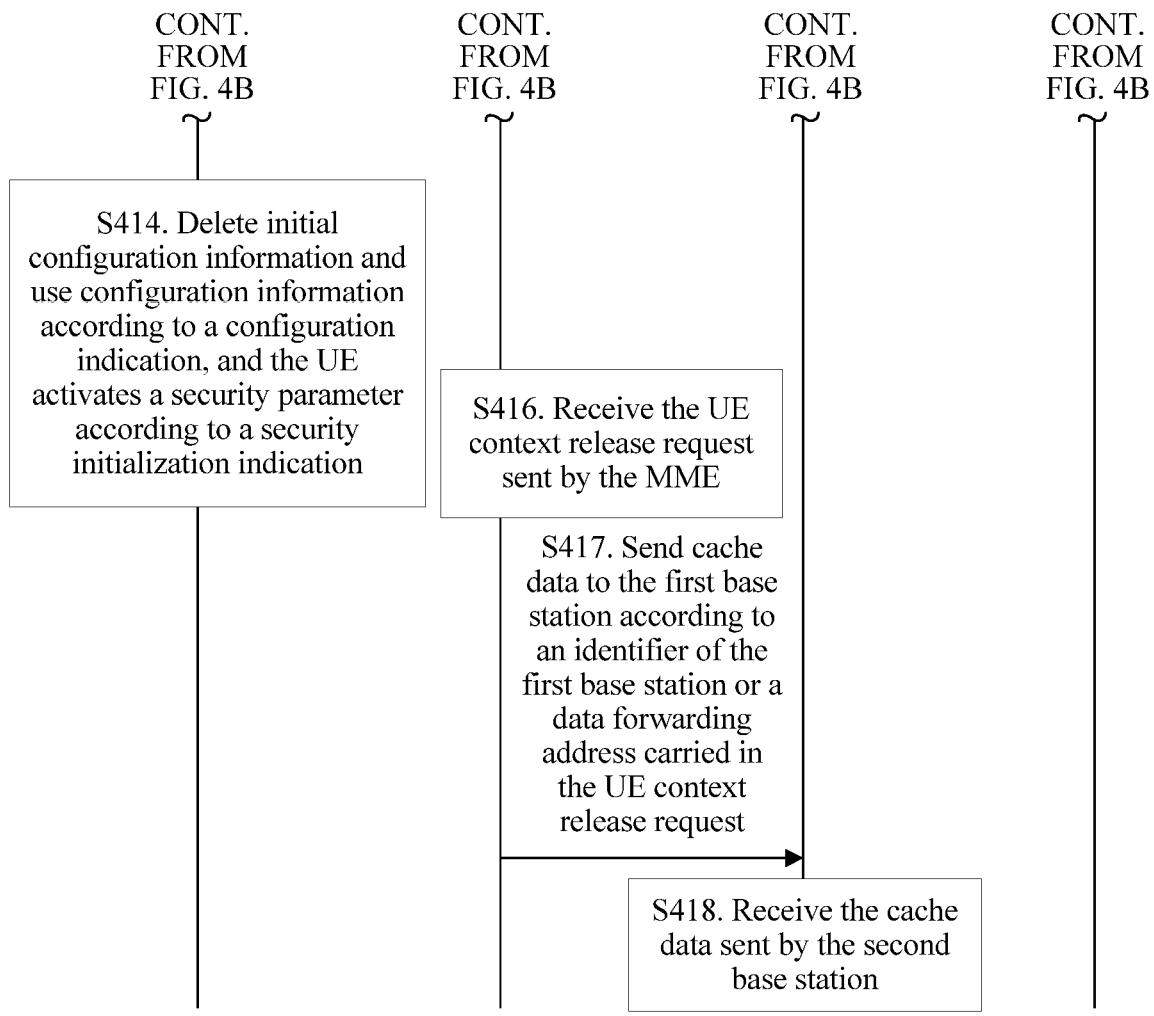
Figure 5A:
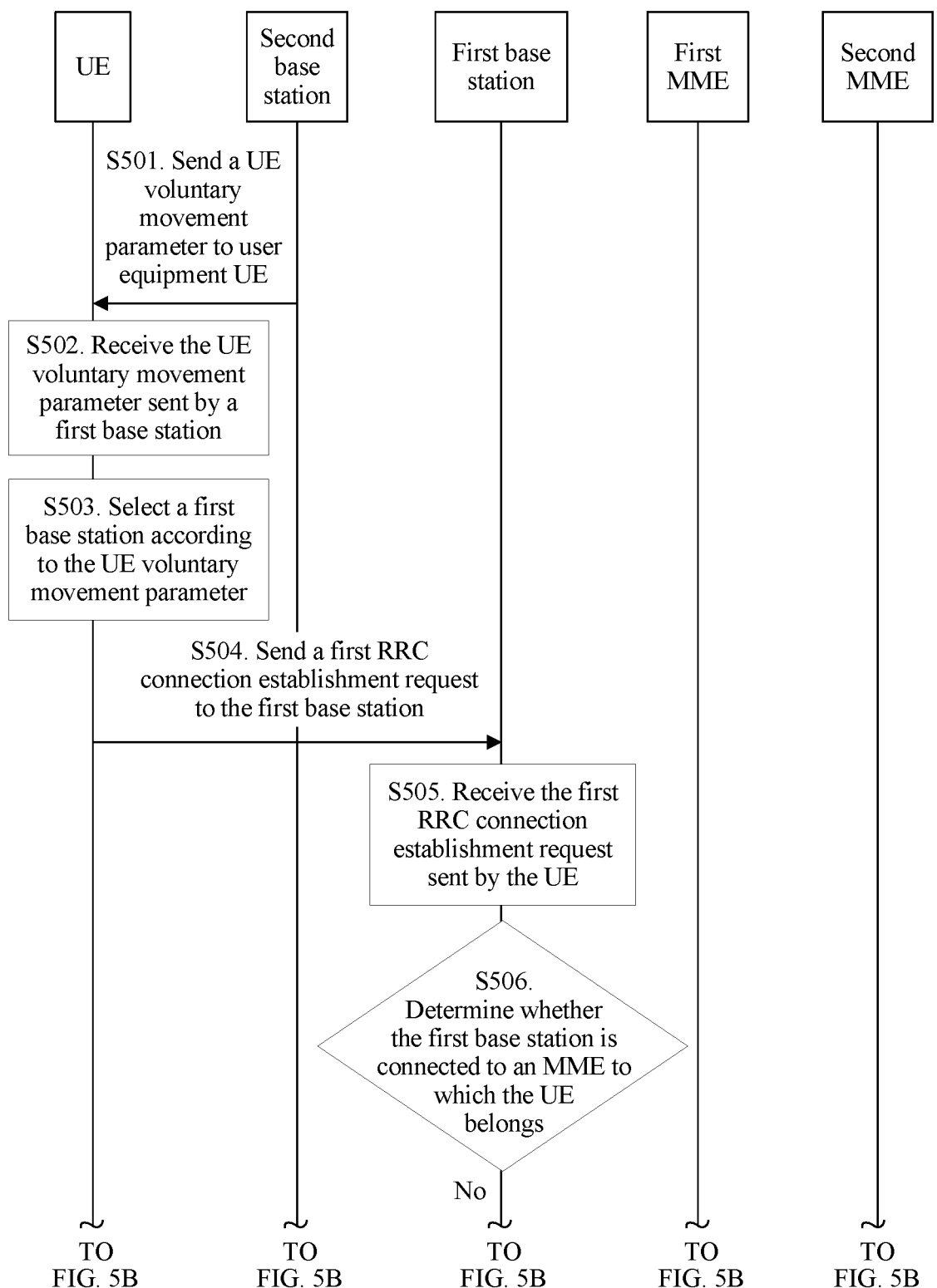
FIG. 5A, FIG. 5B, FIG. 5C, and FIG. 5D are a flowchart of a fourth embodiment of a method of obtaining user equipment context information according to an embodiment of the invention.
Figure 5B:
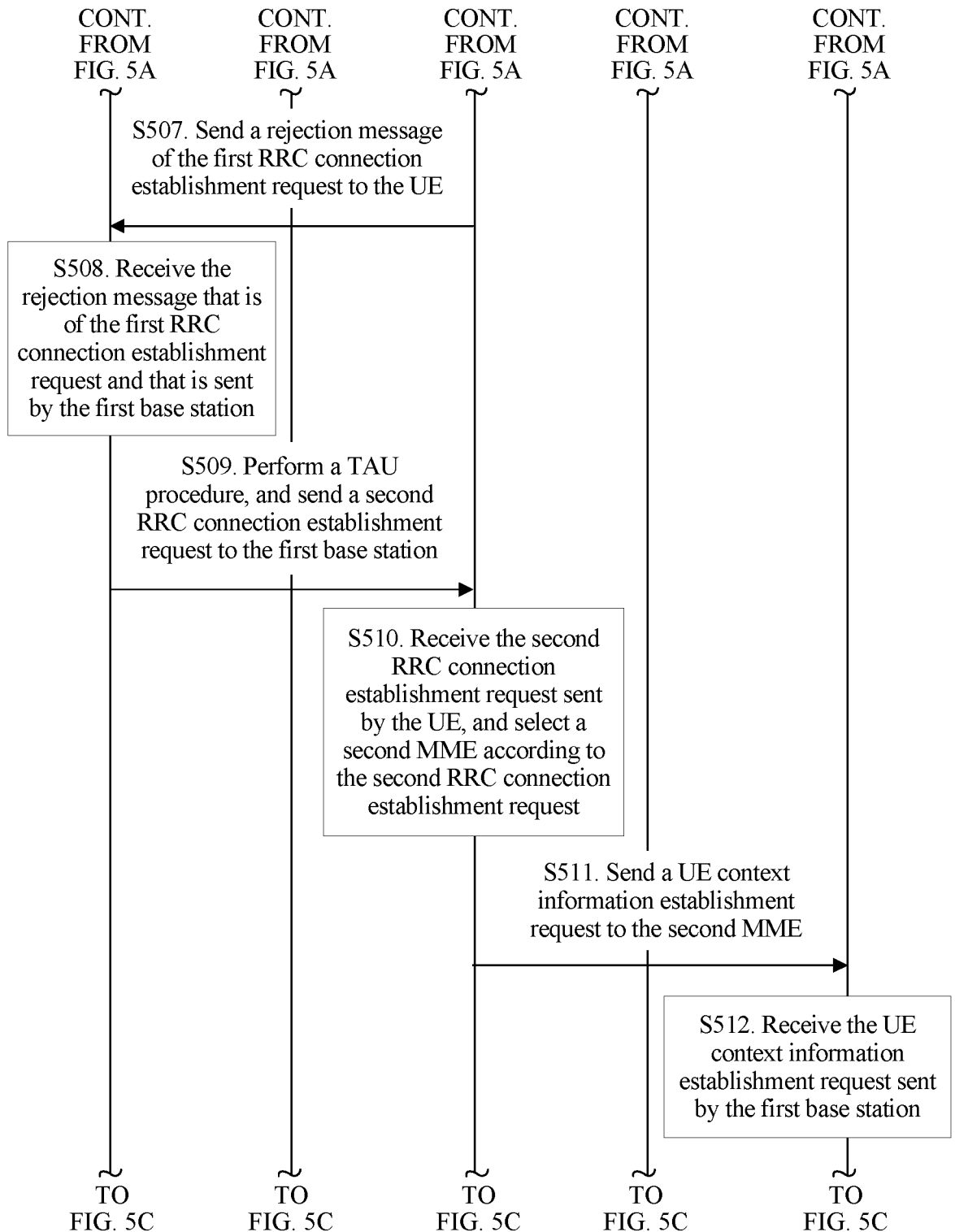
Figure 5C:
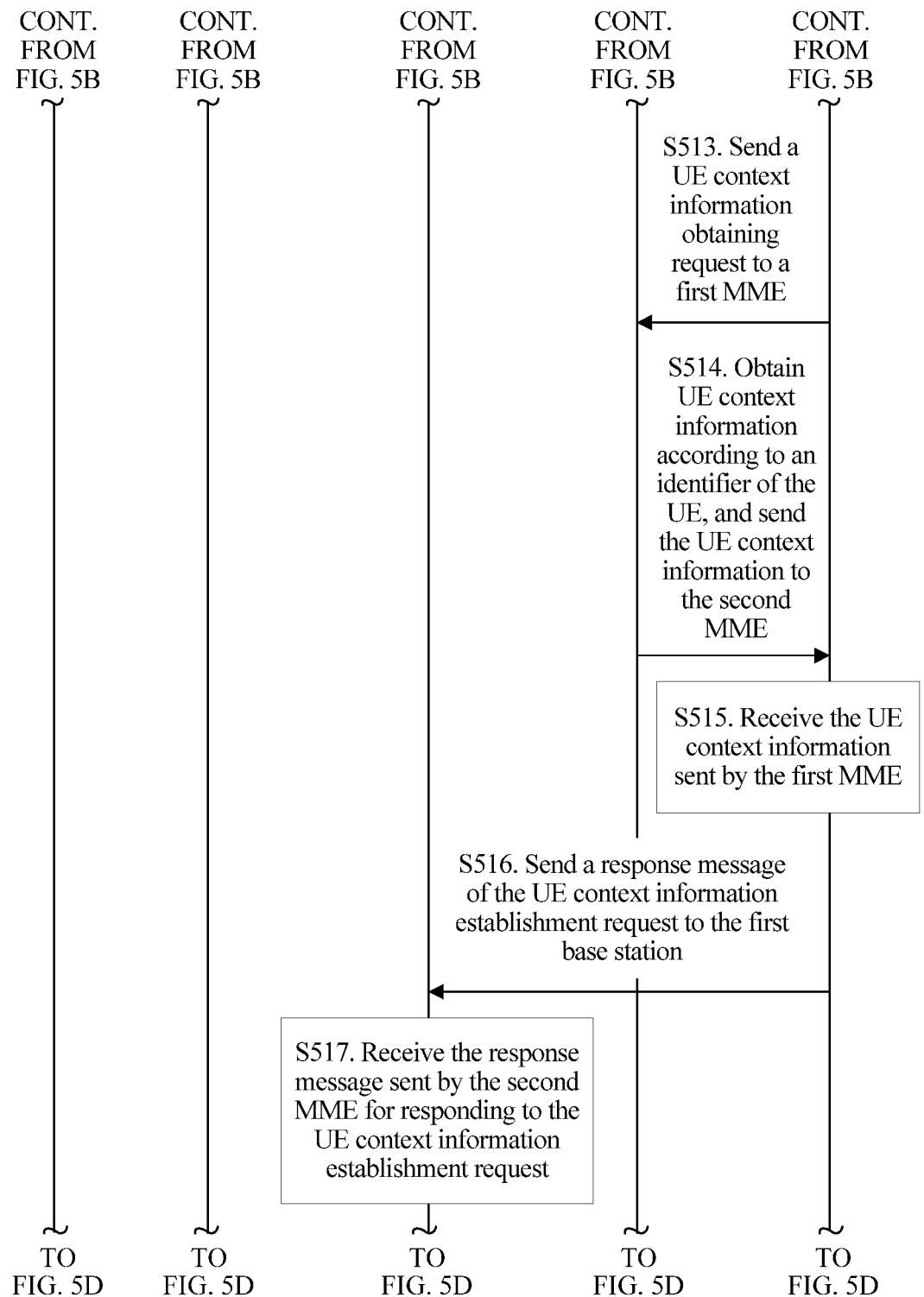
Figure 5D:
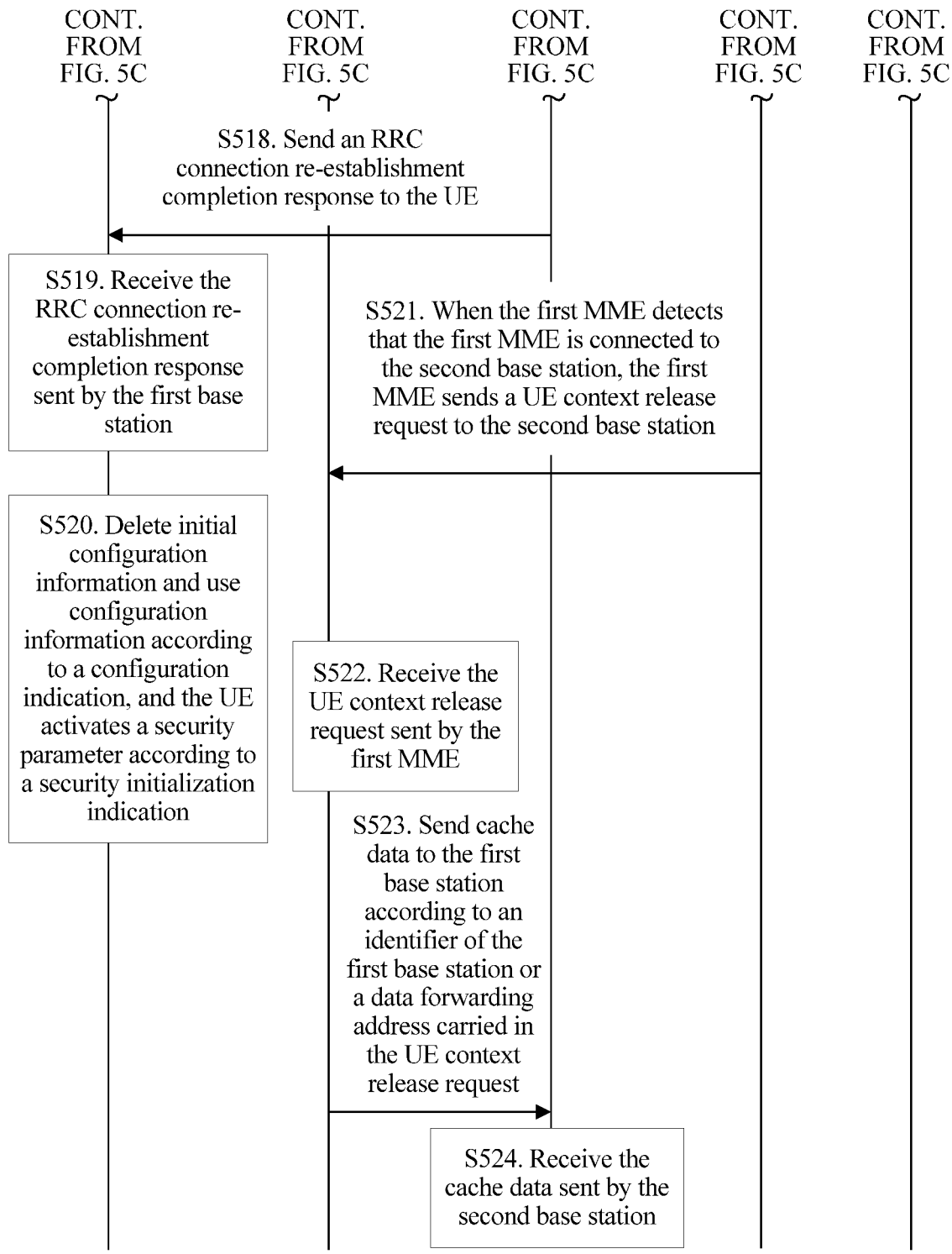

Referring to FIGS. 4A-4C, FIGS. 4A-4C are a flowchart of a third embodiment of a method of obtaining user equipment context information according to an embodiment of the invention. As shown in FIGS. 4A-4C, the method provided may include steps S401 to S418.

At S401, a second base station sends a UE voluntary movement parameter to a UE.

In one embodiment, when the second base station allows the UE to voluntarily move in a long DRX state, the second base station sends DRX configuration information to the UE. The DRX configuration information includes a UE voluntary movement parameter, and the UE voluntary movement parameter includes a UE voluntary movement trigger moment, a UE voluntary movement range, a UE voluntary movement stop moment, and a moment at which the UE initiates RRC connection re-establishment. By default, the UE voluntary movement trigger moment is a moment at which the UE enters a UE voluntary movement state after the UE enters a long DRX sleep period. Entering the long DRX sleep period includes a long DRX inactive timer that expires, long DRX wake-up that expires, or the UE directly receives a long DRX command. Alternatively, the UE voluntary movement trigger moment is a specific time, for example, a moment at which the UE enters the UE voluntary movement state after the UE enters the long DRX sleep period for a specific time period, or a moment at which the UE enters the voluntary movement state when signal quality of a serving cell is lower than a preset threshold. The UE voluntary movement range is a range within which a network can control the UE to voluntarily move, and the UE is allowed to voluntarily move only in a specific range. For example, a cell to which the UE can move, a frequency on which the UE can move, and a list of TAs to which the UE can move are configured, and priorities of candidate cells to which the UE can move are configured, and the UE voluntarily moves in the UE voluntary movement range according to a specific priority rule. The UE voluntary movement stop moment is a configured UE voluntary movement prohibit time (Prohibit timer), and the UE stops voluntary movement within the time. The UE voluntary movement stop moment may be a time prior to DRX wake-up of the UE. This way, upon waking up, the UE can quickly report a measurement report, trigger network control switching, and so on. The moment at which the UE initiates RRC connection re-establishment is a moment at which the UE initiates RRC connection re-establishment to a new base station or a base station to which a new cell belongs when the UE detects handover to the new cell or the new base station.

At S402, the UE receives the UE voluntary movement parameter sent by the second base station.

At S403, after the UE enters a long DRX sleep state, the UE selects the first base station according to the UE voluntary movement parameter.

In one embodiment, the UE selects the first base station according to the UE voluntary movement parameter. For example, the UE selects the first base station according to the UE voluntary movement range included in the UE voluntary movement parameter. In one embodiment, the UE selects, in the voluntary movement range according to priorities of cells in the voluntary movement range, a cell of a higher priority as an RRC re-establishment cell, or the UE selects, in the voluntary movement range according to signal quality of cells in the voluntary movement range, a cell of higher signal quality as an RRC re-establishment cell, and then the UE uses a base station to which the RRC re-establishment cell belongs as the first base station.

At S404, the UE sends a first RRC connection establishment request to the first base station.

In one embodiment, the UE sends the first RRC connection establishment request after entering a long DRX sleep state. In one embodiment, the UE voluntarily moves (for example, re-selects a cell) according to the UE voluntarily movement parameter, and after the UE is handed over to a cell, the UE sends the first RRC connection establishment request to the first base station according to the moment at which the UE initiates RRC connection re-establishment and that is included in the UE voluntarily movement parameter. The first RRC connection establishment request carries the connection status information before the UE sends the first RRC connection establishment request, and the connection status information includes an identifier of the UE, an RRC connection re-establishment reason, an identifier of an original cell or an identifier of an original base station (that is, an identifier of the second base station), and the like. The identifier of the UE may be an overall service account of the UE that is associated with a user's overall data service status, such as a SIM card number, an IMSI, or an MSISDN. The overall service account may be, for example, corresponding to a monthly paid traffic account of a mobile phone. That is, in the overall service account, all traffic consumed by a user for daily applications such as Internet surfing, email sending, chat, file transmission, or video chat by using the UE is counted to a traffic tariff corresponding to the overall service account. A data service account of the UE may further be a particular service account associated with a user's particular data service status, such as a QQMusic listen free data package, a green diamond listen free data package, or an LeTV video content data package. In a service corresponding to the particular service account, traffic consumed by a user who uses the service by using the UE is counted only to the particular service account, but not to the overall service account. For example, a user purchases the QQMusic listen free data package, an OCS system generates a particular service account corresponding to a QQMusic listen free service of the user, and the particular service account may be in a form such as 765367XXX_QQ_music_VIP.

At S405, the first base station receives the first RRC connection establishment request sent by the UE, where the first RRC connection establishment request carries connection status information before the UE sends the first RRC connection establishment request, and the connection status information includes an identifier of the second base station.

At S406, the first base station determines, according to the identifier of the second base station, whether there is an interface for connecting the first base station and the second base station.

If there is an interface for connecting the first base station and the second base station, the first base station requests the second base station for UE context by using a context fetch procedure, so as to complete RRC connection re-establishment of the UE on the first base station.

If there is no interface for connecting the first base station and the second base station, step S407 is performed.

In one embodiment, the first base station determines, according to the identifier of the second base station, whether there is an X2 network connection interface for directly connecting the first base station and the second base station. If there is no X2 network connection interface for directly connecting the first base station and the second base station, the first base station cannot request the second base station for the UE context information by using the context fetch procedure. That is, the first base station does not meet a condition for requesting the UE context information.

At S407, the connection status information includes an identifier of an MME in which the UE belongs, and the first base station determines, according to the identifier of the MME in which the UE belongs, whether the first base station is connected to the MME in which the UE belongs.

If the first base station is connected to the MME in which the UE belongs, step S408 is performed.

If the first base station is not connected to the MME in which the UE belongs, in some embodiments steps S507 to S517 are performed (which will be discussed in more detail herein below).

At S408, the first base station sends the UE context information establishment request to the MME, where the MME is the MME in which the UE belongs, the UE context information establishment request carries an initial message of the UE, and the initial message of the UE includes an identifier of the UE and the identifier of the second base station.

At S409, the MME receives the UE context information establishment request sent by the first base station.

In one embodiment, after the MME receives the UE context information establishment request sent by the first base station, the MME requests the second base station for the UE context information according to the initial message of the UE. In one embodiment, the MME requests the second base station for the UE context information according to the initial message of the UE. For example, the MME sends a UE context information obtaining request to the second base station according to the identifier of the second base station, and the UE context information obtaining request carries the identifier of the UE, so that the second base station obtains the UE context information according to the identifier of the UE, and sends the UE context information to the MME.

At S410, the MME sends a response message to the first base station for responding to the UE context information establishment request, where the response message carries the UE context information.

At S411, the first base station receives the response message sent by the MME for responding to the UE context information establishment request.

At S412, the first base station sends an RRC connection re-establishment completion response to the UE, where the RRC connection re-establishment completion response carries a configuration indication, a security initialization indication, configuration information, and a security parameter.

At S413, the UE receives the RRC connection re-establishment completion response sent by the first base station.

At S414, the UE deletes initial configuration information and uses the configuration information according to the configuration indication, and the UE activates the security parameter according to the security initialization indication.

In one embodiment, because after the first base station obtains new UE context information, the new context information includes the security parameter (that is, a new security parameter, for example, a new KeNB), the first base station needs to activate the security parameter of the UE according to the new KeNB. Therefore, the RRC connection re-establishment completion response sent by the first base station to the UE carries the security initialization indication, so that the UE initializes a derivation key according to the security parameter, and sends the security initialization indication to a NAS layer. The security initialization indication carries the security parameter, so that the NAS initializes a security key according to the security parameter.

At S415, when the MME detects that the MME is connected to the second base station, the MME sends a UE context release request to the second base station, where the UE context release request carries an identifier of the first base station or a data forwarding address.

In one embodiment, after the MME establishes UE context, when the MME detects that the MME retains an S1 connection to the second base station, the MME sends the UE context release request to the second base station, and the UE context release request carries the identifier of the first base station or the data forwarding address, so that the second base station forwards cache data to the first base station.

At S416, the second base station receives the UE context release request sent by the MME.

At S417, the second base station sends cache data to the first base station according to the identifier of the first base station or the data forwarding address carried in the UE context release request.

At S418, the first base station receives the cache data sent by the second base station.

It can be learned that in this embodiment of the invention, when the first base station receives the RRC connection establishment request sent by the UE, and the first base station determines, according to the connection status information that exists before the UE sends the RRC connection establishment request and that is carried in the RRC connection establishment request, that the first base station does not meet the condition for requesting the UE context information, that is, cannot request for the UE context information by way of context fetch, the first base station sends the UE context information establishment request to the MME. The MME sends the response message to the first base station when completing establishing the UE context information, and the response message carries the UE context information, so that the first base station completes an RRC connection re-establishment procedure according to the UE context information, so as to avoid a delay and signaling for releasing the UE and re-establishing a connection after handover of the UE fails, thereby facilitating quick recovery of a service.

Referring to FIGS. 5A-5D, FIG. 5A-5D are a flowchart of a fourth embodiment of a method of obtaining user equipment context information according to an embodiment of the invention. As shown in FIG. 5A-5D, the method provided in this embodiment of the invention may include steps S501 to S524.

At S501, a second base station sends a UE voluntary movement parameter to user equipment UE.

In one embodiment, when the second base station allows the UE to voluntarily move in a long DRX state, the second base station sends DRX configuration information to the UE. The DRX configuration information includes a UE voluntary movement parameter, and the UE voluntary movement parameter includes a UE voluntary movement trigger moment, a UE voluntary movement range, a UE voluntary movement stop moment, and a moment at which the UE initiates RRC connection re-establishment. By default, the UE voluntary movement trigger moment is a moment at which the UE enters a UE voluntary movement state after the UE enters a long DRX sleep period. Entering the long DRX sleep period includes a long DRX inactive timer that expires, long DRX wake-up that expires, or the UE directly receives a long DRX command. Alternatively, the UE voluntary movement trigger moment is a specific time, for example, a moment at which the UE enters the UE voluntary movement state after the UE enters the long DRX sleep period for a specific time period, or a moment at which the UE enters the voluntary movement state when signal quality of a serving cell is lower than a preset threshold. The UE voluntary movement range is a range within which a network can control the UE to voluntarily move, and the UE is allowed to voluntarily move only in a specific range. For example, a cell to which the UE can move, a frequency on which the UE can move, and a list of TAs to which the UE can move are configured, and priorities of candidate cells to which the UE can move are configured, and the UE voluntarily moves in the UE voluntary movement range according to a specific priority rule. The UE voluntary movement stop moment is a configured UE voluntary movement prohibit time (or prohibit timer), and the UE stops voluntary movement within the time. The UE voluntary movement stop moment may be a time prior to DRX waking up of the UE. This way, upon waking up, the UE can quickly report a measurement report, trigger network control switching, and so on. The moment at which the UE initiates RRC connection re-establishment is a moment at which the UE initiates RRC connection re-establishment to a new base station or a base station to which a new cell belongs when the UE detects handover to the new cell or the new base station.

At S502, the UE receives the UE voluntary movement parameter sent by the first base station.

At S503, after the UE enters a long DRX sleep state, the UE selects the first base station according to the UE voluntary movement parameter.

In one embodiment, the UE selects the first base station according to the UE voluntary movement parameter. For example, the UE selects the first base station according to the UE voluntary movement range included in the UE voluntary movement parameter. In one embodiment, the UE selects, in the voluntary movement range according to priorities of cells in the voluntary movement range, a cell of a higher priority as an RRC re-establishment cell, or the UE selects, in the voluntary movement range according to signal quality of cells in the voluntary movement range, a cell of higher signal quality as an RRC re-establishment cell, and then the UE uses a base station to which the RRC re-establishment cell belongs as the first base station.

At S504, the UE sends a first RRC connection establishment request to the first base station.

In one embodiment, the UE sends the first RRC connection establishment request after entering a long DRX sleep state. In one embodiment, the UE voluntarily moves (for example, re-selects a cell) according to the UE voluntarily movement parameter, and after the UE is handed over to a cell, the UE sends the first radio resource control RRC connection establishment request to the first base station according to the moment at which the UE initiates RRC connection re-establishment and that is included in the UE voluntarily movement parameter. The first RRC connection establishment request carries the connection status information before the UE sends the first RRC connection establishment request, and the connection status information includes an identifier of the UE, an RRC connection re-establishment reason, an identifier of an original cell or an identifier of an original base station (that is, an identifier of the second base station), and the like. The identifier of the UE may be an overall service account of the UE that is associated with a user's overall data service status, such as a SIM card number, an IMSI, or an MSISDN. The overall service account may be, for example, corresponding to a monthly paid traffic account of a mobile phone. That is, in the overall service account, all traffic consumed by a user for daily applications such as Internet surfing, email sending, chat, file transmission, or video chat by using the UE is counted to a traffic tariff corresponding to the overall service account. A data service account of the UE may further be a particular service account associated with a user's particular data service status, such as a QQMusic listen free data package, a green diamond listen free data package, or an LeTV video content data package. In a service corresponding to the particular service account, traffic consumed by a user who uses the service by using the UE is counted only to the particular service account, but not to the overall service account. For example, a user purchases the QQMusic listen free data package, an OCS system generates a particular service account corresponding to a QQMusic listen free service of the user, and the particular service account may be in a form such as 765367XXX_QQ_music_VIP.

At S505, the first base station receives the first RRC connection establishment request sent by the UE, where the first RRC connection establishment request carries connection status information before the UE sends the first RRC connection establishment request, and the connection status information includes an identifier of an MME in which the UE belongs.

At S506, the first base station determines, according to the identifier of the MME in which the UE belongs, whether the first base station is connected to the MME in which the UE belongs.

If the first base station is connected to the MME in which the UE belongs, steps
S408 to S411 in some embodiments are performed.

If the first base station is not connected to the MME in which the UE belongs, step S507 is performed.

In one embodiment, the first base station determines, according to the identifier of the MME in which the UE belongs, whether the first base station and the second base station are connected to a same MME. If the first base station and the second base station are not connected to the same MME, the first base station cannot request, by using the context fetch procedure, the identifier of the MME in which the UE belongs for the UE context information, that is, the first base station does not meet the condition for requesting the UE context information.

At S507, the first base station sends a rejection message of the first RRC connection establishment request to the UE, where the rejection message is used to trigger the UE to perform TAU.

At S508, the UE receives the rejection message that is of the first RRC connection establishment request and that is sent by the first base station.

At S509, the UE performs a TAU procedure, and sends a second RRC connection establishment request to the first base station.

At S510, the first base station receives the second RRC connection establishment request sent by the UE, and selects a second MME according to the second RRC connection establishment request, where the MME is an MME other than the MME in which the UE belongs.

In this embodiment of the invention, the second MME is an MME randomly selected by the first base station from all MMEs that can be connected to the first base station, after the first base station receives the second RRC connection establishment request sent by the UE. If the first base station can be connected to more than one MME, in one embodiment the first base station may select the MME. For example, the first base station may select an MME of a higher priority as the second MME according to priorities of the MMEs.

At S511, the first base station sends the UE context information establishment request to the second MME.

At S512, the second MME receives the UE context information establishment request sent by the first base station, where the UE context information establishment request carries an identifier of the UE and the identifier of the MME in which the UE belongs.

At S513, the second MME sends the UE context information obtaining request to a first MME according to the identifier of the MME in which the UE belongs, where the first MME is the MME in which the UE belongs, and the UE context information obtaining request carries the identifier of the UE.

At S514, the first MME obtains the UE context information according to the identifier of the UE, and sends the UE context information to the second MME.

At S515, the second MME receives the UE context information sent by the first MME.

At S516, the second MME sends a response message of the UE context information establishment request to the first base station.

At S517, the first base station receives the response message sent by the second MME for responding to the UE context information establishment request, where the response message carries the UE context information.

At S518, the first base station sends an RRC connection re-establishment completion response to the UE, where the RRC connection re-establishment completion response carries a configuration indication, a security initialization indication, configuration information, and a security parameter.

At S519, the UE receives the RRC connection re-establishment completion response sent by the first base station.

At S520, the UE deletes initial configuration information and uses the configuration information according to the configuration indication, and the UE activates the security parameter according to the security initialization indication.

In this embodiment of the invention, because after the first base station obtains new UE context information, the new context information includes the security parameter (that is, a new security parameter, for example, a new KeNB), the first base station needs to activate the security parameter of the UE according to the new KeNB. Therefore, the RRC connection re-establishment completion response sent by the first base station to the UE carries the security initialization indication, so that the UE initializes a derivation key according to the security parameter, and sends the security initialization indication to a NAS layer. The security initialization indication carries the security parameter, so that the NAS initializes a security key according to the security parameter.

At S521, when the first MME detects that the first MME is connected to the second base station, the first MME sends a UE context release request to the second base station, where the UE context release request carries an identifier of the first base station or a data forwarding address.

In one embodiment, after the first MME establishes UE context, when the first MME detects that the first MME retains an S1 connection to the second base station, the first MME sends the UE context release request to the second base station, and the UE context release request carries the identifier of the first base station or the data forwarding address, so that the second base station forwards cache data to the first base station.

At S522, the second base station receives the UE context release request sent by the first MME.

At S523, the second base station sends cache data to the first base station according to the identifier of the first base station or the data forwarding address carried in the UE context release request.

At S524, the first base station receives the cache data sent by the second base station.

It can be learned that in this embodiment of the invention, when the first base station receives the RRC connection establishment request sent by the UE, and the first base station determines, according to the connection status information that exists before the UE sends the RRC connection establishment request and that is carried in the RRC connection establishment request, that the first base station does not meet the condition for requesting the UE context information, that is, cannot request for the UE context information by means of context fetch, the first base station sends the UE context information establishment request to the mobility management entity MME. The MME sends the response message to the first base station when completing establishing the UE context information, and the response message carries the UE context information, so that the first base station completes an RRC connection re-establishment procedure according to the UE context information, so as to avoid a delay and signaling for releasing the UE and re-establishing a connection after handover of the UE fails, thereby facilitating quick recovery of a service.

Figure 6:
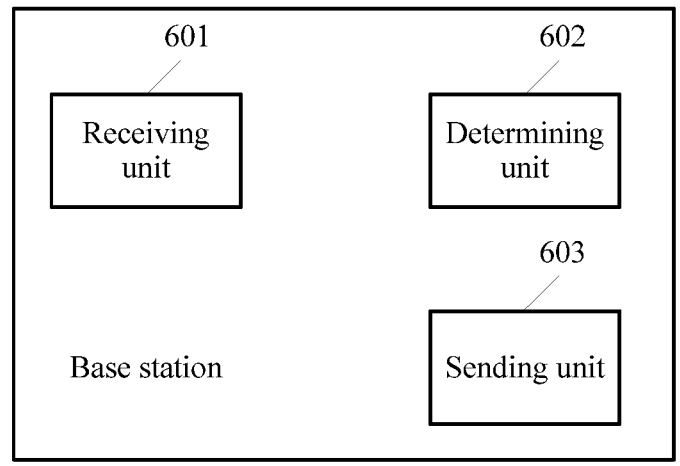
FIG. 6 is a schematic structural diagram of a base station according to an embodiment of the invention.

Referring to FIG. 6, a base station provided in an embodiment of the invention may include:

a receiving unit 601 configured to receive a first RRC connection establishment request sent by a UE, where the first RRC connection establishment request carries connection status information before the UE sends the first RRC connection establishment request;

a determining unit 602 configured to determine, according to the connection status information, whether the first base station meets a condition for requesting the UE context information; and a sending unit 603 configured to: if the determining unit determines that the first base station does not meet the condition for requesting the UE context information, send the UE context information establishment request to an MME.

In one embodiment, the receiving unit 601 is further configured to receive a response message sent by the MME for responding to the UE context information establishment request, where the response message carries the UE context information.

The connection status information includes an identifier of an MME in which the UE belongs, and the determining unit is further configured to: determine, according to the identifier of the MME in which the UE belongs, whether the first base station is connected to the MME in which the UE belongs, where if the first base station is not connected to the MME in which the UE belongs, the determining unit determines that the first base station does not meet the condition for requesting the UE context information.

In one embodiment, the MME is different from the MME in which the UE belongs, the UE context information establishment request carries an identifier of the UE and the identifier of the MME in which the UE belongs, and the UE context information establishment request is used to trigger the MME to request the MME in which the UE belongs for the UE context information according to the identifier of the MME in which the UE belongs.

The connection status information includes an identifier of a second base station, and the determining unit is further configured to: determine, according to the identifier of the second base station, whether there is an interface for connecting the first base station and the second base station, where if there is no interface for connecting the first base station and the second base station, the determining unit determines that the first base station does not meet the condition for requesting the UE context information.

In one embodiment, the MME is the MME in which the UE belongs, the first base station is connected to the MME in which the UE belongs, the UE context information establishment request carries an initial message of the UE, and the UE context information establishment request is used to trigger the MME in which the UE belongs to request the second base station for the UE context information according to the initial message of the UE.

In one embodiment, before the sending unit 603 sends the UE context information establishment request to the MME, the sending unit 603 is further configured to send a rejection message of the first RRC connection establishment request to the UE, where the rejection message is used to trigger the UE to perform TAU; and the receiving unit 601 is further configured to: receive a second RRC connection establishment request sent by the UE, and select, according to the second RRC connection establishment request, an MME other than the MME in which the UE belongs.

In one embodiment, after the receiving unit 601 receives the response message sent by the MME for responding to the UE context information establishment request, the sending unit 603 is further configured to send an RRC connection re-establishment completion response to the UE, where the RRC connection re-establishment completion response carries a configuration indication, a security initialization indication, configuration information, and a security parameter.

In one embodiment, after the receiving unit 601 receives the response message sent by the MME for responding to the UE context information establishment request, the receiving unit is further configured to receive cache data sent by the second base station.

It may be understood that functions of functional modules in the base station in this embodiment may be specifically implemented according to the methods in the foregoing method embodiments. For a specific implementation process, refer to related descriptions of the foregoing method embodiments, and details are not described herein again. Some or all of the functional modules in the base station may be implemented by a hardware circuit, or some or all of the functional modules in the base station may be implemented by a processor (for example, a digital signal processor) by executing code or an instruction.

It can be learned that in this embodiment of the invention, when the first base station receives the RRC connection establishment request sent by the UE, and the first base station determines, according to the connection status information that exists before the UE sends the RRC connection establishment request and that is carried in the RRC connection establishment request, that the first base station does not meet the condition for requesting the UE context information, that is, cannot request for the UE context information by means of context fetch, the first base station sends the UE context information establishment request to the mobility management entity MME. The MME sends the response message to the first base station when completing establishing the UE context information, and the response message carries the UE context information, so that the first base station completes an RRC connection re-establishment procedure according to the UE context information, so as to avoid a delay and signaling for releasing the UE and re-establishing a connection after handover of the UE fails, thereby facilitating quick recovery of a service.

Figure 7:
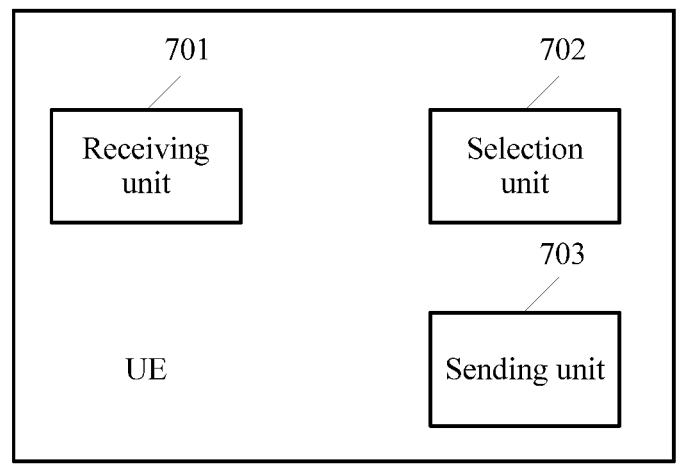
FIG. 7 is a schematic structural diagram of a first embodiment of a UE according to an embodiment of the invention.

Referring to FIG. 7, a UE provided in an embodiment of the invention may include:

a receiving unit 701 configured to receive the UE voluntary movement parameter sent by a second base station;

a selection unit 702 configured to select a first base station according to the UE voluntary movement parameter received by the receiving unit; and a sending unit 703 configured to send a first RRC connection establishment request to the first base station according to the UE voluntary movement parameter received by the receiving unit.

The first RRC connection establishment request carries connection status information before the UE sends the first RRC connection establishment request, and the first RRC connection establishment request is used to instruct the first base station to: when determining, according to the connection status information, that the first base station does not meet a condition for requesting UE context information, send the UE context information establishment request to a mobility management entity MME.

In one embodiment, after the sending unit 703 sends the first RRC connection establishment request to the first base station according to the UE voluntary movement parameter received by the receiving unit, the receiving unit is further configured to receive an RRC connection establishment completion response sent by the first base station, where the RRC connection re-establishment completion response carries a configuration indication, a security initialization indication, configuration information, and a security parameter; and the UE further includes a processing unit, configured to: delete initial configuration information and use the configuration information according to the configuration indication; and activate the security parameter according to the security initialization indication.

In one embodiment, after the sending unit 703 sends the first RRC connection establishment request to the first base station according to the UE voluntary movement parameter received by the receiving unit, the receiving unit is further configured to receive a rejection message that is of the first RRC connection establishment request and that is sent by the first base station; the processing unit is further configured to perform a TAU procedure; and the sending unit is further configured to send a second RRC connection establishment request to the first base station, where the second RRC connection establishment request is used to trigger the first base station to select an MME other than an MME in which the UE belongs.

It may be understood that functions of functional modules in the UE in this embodiment may be specifically implemented according to the methods in the foregoing method embodiments. For a specific implementation process, refer to related descriptions of the foregoing method embodiments, and details are not described herein again. Some or all of the functional modules in the UE may be implemented by a hardware circuit, or some or all of the functional modules in the UE may be implemented by a processor (for example, a digital signal processor) by executing code or an instruction.

It can be learned that in this embodiment of the invention, when the first base station receives the RRC connection establishment request sent by the UE, and the first base station determines, according to the connection status information that exists before the UE sends the RRC connection establishment request and that is carried in the RRC connection establishment request, that the first base station does not meet the condition for requesting the UE context information, that is, cannot request for the UE context information by means of context fetch, the first base station sends the UE context information establishment request to the mobility management entity MME. The MME sends the response message to the first base station when completing establishing the UE context information, and the response message carries the UE context information, so that the first base station completes an RRC connection re-establishment procedure according to the UE context information, so as to avoid a delay and signaling for releasing the UE and re-establishing a connection after handover of the UE fails, thereby facilitating quick recovery of a service.

Figure 8:
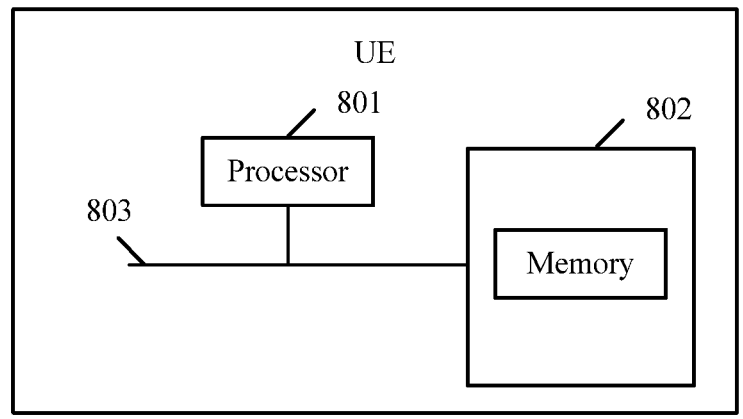
FIG. 8 is a schematic structural diagram of a second embodiment of a UE according to an embodiment of the invention.

Referring to FIG. 8, FIG. 8 is a schematic structural diagram of a second embodiment of a UE according to an embodiment of the invention. The UE may include a processor 801 and a memory 802 coupled to the processor 801 to store instructions, which when executed by the processor 801, cause the processor 801 to perform operations that include:

receiving the UE voluntary movement parameter sent by a second base station;

selecting a first base station according to the UE voluntary movement parameter; and sending a first RRC connection establishment request to the first base station according to the UE voluntary movement parameter.

The first RRC connection establishment request carries connection status information before the UE sends the first RRC connection establishment request, and the first RRC connection establishment request is used to instruct the first base station to: when determining, according to the connection status information, that the first base station does not meet a condition for requesting UE context information, send the UE context information establishment request to an MME.

In one embodiment, after the sending a first RRC connection establishment request to the first base station according to the UE voluntary movement parameter, the operations further include: receiving an RRC connection establishment completion response sent by the first base station, where the RRC connection re-establishment completion response carries a configuration indication, a security initialization indication, configuration information, and a security parameter; deleting initial configuration information and use the configuration information according to the configuration indication; and activating the security parameter according to the security initialization indication.

In one embodiment, after sending a first RRC connection establishment request to the first base station according to the UE voluntary movement parameter, the operations further include: receiving a rejection message that is of the first RRC connection establishment request and that is sent by the first base station; and perform a TAU procedure, and send a second RRC connection establishment request to the first base station, where the second RRC connection establishment request is used to trigger the first base station to select an MME other than an MME in which the UE belongs.

It may be understood that functions of functional modules in the UE in this embodiment may be implemented according to the methods in the foregoing method embodiments. For a specific implementation process, refer to related descriptions of the foregoing method embodiments, and details are not described herein again. Some or all of the functional modules in the UE may be implemented by a hardware circuit, or some or all of the functional modules in the UE may be implemented by a processor (for example, a digital signal processor) by executing code or an instruction.

It can be learned that in this embodiment of the invention, when the first base station receives the RRC connection establishment request sent by the UE, and the first base station determines, according to the connection status information that exists before the UE sends the RRC connection establishment request and that is carried in the RRC connection establishment request, that the first base station does not meet the condition for requesting the UE context information, that is, cannot request for the UE context information by means of context fetch, the first base station sends the UE context information establishment request to the mobility management entity MME. The MME sends the response message to the first base station when completing establishing the UE context information, and the response message carries the UE context information, so that the first base station completes an RRC connection re-establishment procedure according to the UE context information, so as to avoid a delay and signaling for releasing the UE and re-establishing a connection after handover of the UE fails, thereby facilitating quick recovery of a service.

It should be noted that, to make the description brief, the foregoing method embodiments are expressed as a series of actions. However, persons skilled in the art should appreciate that the invention is not limited to the described action sequence, because according to the invention, some steps may be performed in other sequences or performed simultaneously. In addition, persons skilled in the art should also appreciate that all the embodiments described in the specification are example embodiments, and the related actions and modules are not necessarily mandatory to the invention.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the invention. The foregoing storage medium includes: any medium that can store program code, such as a USB flash drive, a read-only memory (ROM), a random access memory (RAM), a removable hard disk, a magnetic disk, or an optical disc.

The foregoing embodiments are merely intended for describing the technical solutions of the invention, but not for limiting the invention. Although the invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the invention.

What is claimed is:

1. A computer-implemented method of obtaining user equipment context information, comprising:
   receiving, by a first base station, a first radio resource control (RRC) connection establishment request sent by a user equipment (UE), wherein the first RRC connection establishment request carries connection status information prior to the UE sends the first RRC connection establishment request;
   determining, by the first base station according to the connection status information, whether the first base station meets a condition for requesting UE context information;
   if the first base station determines that the first base station does not meet the condition for requesting the UE context information, sending, by the first base station, a UE context information establishment request to a first core network; and
   receiving, by the first base station, a response message sent by the first core network for responding to the UE context information establishment request, wherein the response message carries the UE context information.

2. The method according to claim 1,
   wherein the connection status information comprises an identifier of a second core network, wherein the UE belongs in the second core network, and
   wherein determining whether the first base station meets the condition for requesting the UE context information comprises:
      determining, by the first base station according to the identifier of the second core network, whether the first base station is connected to the second core network; and
      if the first base station is not connected to the second core network, determining, by the first base station, that the first base station does not meet the condition for requesting the UE context information.

3. The method according to claim 2, wherein
   the first core network is different from the second core network,
   the UE context information establishment request carries an identifier of the UE and the identifier of the second core network, and
   the UE context information establishment request is used to trigger the first core network to request the second core network for the UE context information according to the identifier of the second core network.

4. The method according to claim 3, further comprising:
   prior to sending the UE context information establishment request to the first core network,
      sending, by the first base station, a rejection message of the first RRC connection establishment request to the UE, wherein the rejection message is used to trigger the UE to perform tracking area update (TAU); and
      receiving, by the first base station, a second RRC connection establishment request sent by the UE, and
      selecting, according to the second RRC connection establishment request, a core network other than the second core network.

5. The method according to claim 1, wherein
   the connection status information comprises an identifier of a second base station, and
   wherein determining whether the first base station meets the condition for requesting the UE context information comprises:
      determining, by the first base station according to the identifier of the second base station, whether there is an interface for connecting the first base station and the second base station; and
      if there is no interface for connecting the first base station and the second base station, determining, by the first base station, that the first base station does not meet the condition for requesting the UE context information.

6. The method according to claim 5, wherein
   the UE belongs in the first core network,
   the first base station is connected to the first core network,
   the UE context information establishment request carries an initial message of the UE, and
   the UE context information establishment request is used to trigger the first core network to request the second base station for the UE context information according to the initial message of the UE.

7. The method according to claim 1, further comprising:
   after receiving the response message sent by the first core network for responding to the UE context information establishment request,
      sending, by the first base station, an RRC connection re-establishment completion response to the UE, wherein the RRC connection re-establishment completion response carries a configuration indication, a security initialization indication, configuration information, and a security parameter.

8. A computer-implemented method of obtaining user equipment context information, comprising:
   receiving, by user equipment (UE), a UE voluntary movement parameter sent by a second base station;
   selecting, by the UE, a first base station according to the UE voluntary movement parameter; and
   sending, by the UE, a first radio resource control (RRC) connection establishment request to the first base station according to the UE voluntary movement parameter;
   wherein the first RRC connection establishment request carries connection status information prior to the UE sends the first RRC connection establishment request, and
   wherein the first RRC connection establishment request is used to instruct the first base station to: when determining, according to the connection status information, that the first base station does not meet a condition for requesting UE context information, send the UE context information establishment request to a core network.

9. The method according to claim 8, further comprising:
   after sending the first RRC connection establishment request to the first base station according to the UE voluntary movement parameter,
      receiving, by the UE, an RRC connection re-establishment completion response sent by the first base station, wherein the RRC connection re-establishment completion response carries a configuration indication, a security initialization indication, configuration information, and a security parameter;
      deleting, by the UE, initial configuration information and using the configuration information according to the configuration indication; and
      activating, by the UE, the security parameter according to the security initialization indication.

10. The method according to claim 8, further comprising:
after the sending the first RRC connection establishment request to the first base station according to the UE voluntary movement parameter,
receiving, by the UE, a rejection message that is of the first RRC connection establishment request and that is sent by the first base station; and
performing, by the UE, a tracking area update (TAU) procedure, and sending a second RRC connection establishment request to the first base station, wherein the second RRC connection establishment request is used to trigger the first base station to select a core network other than a core network in which the UE belongs.

11. An apparatus for obtaining user equipment context information, comprising:
a processor; and
a memory coupled to the processor to store instructions, which when executed by the processor, cause the processor to perform operations that include:
receiving a user equipment (UE) voluntary movement parameter sent by a second base station;
selecting a first base station according to the UE voluntary movement parameter; and
sending a first radio resource control (RRC) connection establishment request to the first base station according to the UE voluntary movement parameter;
wherein the first RRC connection establishment request carries connection status information prior to sending the first RRC connection establishment request, and
wherein the first RRC connection establishment request is used to instruct the first base station to: when determining, according to the connection status information, that the first base station does not meet a condition for requesting UE context information, send the UE context information establishment request to a core network.

12. The apparatus according to claim 11, wherein the operations further include:
receiving an RRC connection establishment completion response sent by the first base station, wherein the RRC connection re-establishment completion response carries a configuration indication, a security initialization indication, configuration information, and a security parameter;
deleting initial configuration information and use the configuration information according to the configuration indication; and
activating the security parameter according to the security initialization indication.

13. The apparatus according to claim 11, wherein the operations further include:
receiving a rejection message that is of the first RRC connection establishment request and that is sent by the first base station;
performing a tracking area update (TAU) procedure; and
sending a second RRC connection establishment request to the first base station, wherein the second RRC connection establishment request is used to trigger the first base station to select a core network other than a core network in which a UE belongs.

* * * * *